United States Patent
Kawahira et al.

(10) Patent No.: US 10,725,336 B2
(45) Date of Patent: *Jul. 28, 2020

(54) LIQUID CRYSTAL DISPLAY PANEL AND LIQUID CRYSTAL DISPLAY DEVICE

(71) Applicant: SHARP KABUSHIKI KAISHA, Sakai, Osaka (JP)

(72) Inventors: Yuichi Kawahira, Sakai (JP); Akira Sakai, Sakai (JP); Kozo Nakamura, Sakai (JP); Masahiro Hasegawa, Sakai (JP); Takako Koide, Sakai (JP); Koji Murata, Sakai (JP); Kiyoshi Minoura, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/302,632

(22) PCT Filed: May 16, 2017

(86) PCT No.: PCT/JP2017/018365
§ 371 (c)(1),
(2) Date: Nov. 17, 2018

(87) PCT Pub. No.: WO2017/199953
PCT Pub. Date: Nov. 23, 2017

(65) Prior Publication Data
US 2019/0219871 A1 Jul. 18, 2019

(30) Foreign Application Priority Data
May 20, 2016 (JP) .................... 2016-101553

(51) Int. Cl.
*G02F 1/1333* (2006.01)
*G02F 1/1335* (2006.01)
(Continued)

(52) U.S. Cl.
CPC ......... *G02F 1/133528* (2013.01); *G02B 5/30* (2013.01); *G02F 1/1339* (2013.01);
(Continued)

(58) Field of Classification Search
CPC .................................. G02F 1/133528
See application file for complete search history.

(56) References Cited

U.S. PATENT DOCUMENTS

2005/0037155 A1* 2/2005 Shuto ............... G02B 5/3016
428/1.1
2008/0024416 A1* 1/2008 Onogi ............ G02F 1/134336
345/92

(Continued)

FOREIGN PATENT DOCUMENTS

JP  2008-026587 A  2/2008
JP  2008-083492 A  4/2008
(Continued)

OTHER PUBLICATIONS

H. Imayama et al. 57.1: Novel Pixel Design for a Transflective IPS-LCD with an In-Cell Retarder, SID 07 DIGEST, p. 1651-1654.

*Primary Examiner* — Sang V Nguyen
(74) *Attorney, Agent, or Firm* — ScienBiziP, P.C.

(57) ABSTRACT

The liquid crystal display panel includes: a first polarizing plate; a first λ/4 plate; a first substrate; a second λ/4 plate; a liquid crystal layer; a second substrate; and a second polarizing plate, wherein the first substrate includes a black matrix but no photo spacer, the second substrate includes a photo spacer overlapping with the black matrix, liquid crystal molecules in the liquid crystal layer homogeneously align with no voltage application, the second λ/4 plate covers no side surface of the photo spacer, and the in-plane slow axis of the first λ/4 plate forms an angle of 45° with the
(Continued)

transmission axis of the first polarizing plate and is orthogonal to the in-plane slow axis of the second λ/4 plate.

14 Claims, 15 Drawing Sheets

(51) Int. Cl.
    *G02F 1/13363*      (2006.01)
    *G02F 1/1339*      (2006.01)
    *G02B 5/30*      (2006.01)
    *G02F 1/1337*      (2006.01)
    *G02F 1/1343*      (2006.01)

(52) U.S. Cl.
    CPC .... *G02F 1/13363* (2013.01); *G02F 1/133512* (2013.01); *G02F 1/133514* (2013.01); *G02F 1/133723* (2013.01); *G02F 1/134363* (2013.01); *G02F 1/13394* (2013.01); *G02F 1/133707* (2013.01); *G02F 2001/133519* (2013.01); *G02F 2001/133541* (2013.01); *G02F 2001/133565* (2013.01); *G02F 2001/133638* (2013.01); *G02F 2001/133738* (2013.01); *G02F 2001/134372* (2013.01); *G02F 2201/121* (2013.01); *G02F 2201/123* (2013.01); *G02F 2413/02* (2013.01); *G02F 2413/05* (2013.01)

(56) References Cited

U.S. PATENT DOCUMENTS

| | | | | |
|---|---|---|---|---|
| 2010/0231842 | A1* | 9/2010 | Ishitani | G02F 1/13394 349/156 |
| 2011/0291552 | A1* | 12/2011 | Kwon | C09K 9/02 313/504 |
| 2012/0218497 | A1 | 8/2012 | Kajita | |
| 2013/0235315 | A1* | 9/2013 | Ito | G02F 1/133784 349/126 |
| 2015/0212294 | A1* | 7/2015 | Imamura | G03B 13/36 348/345 |
| 2016/0107888 | A1* | 4/2016 | Omatsu | B82Y 30/00 428/195.1 |
| 2018/0129101 | A1* | 5/2018 | Kawahira | G02F 1/1337 |
| 2018/0335557 | A1* | 11/2018 | Ockenfuss | G02B 5/286 |

FOREIGN PATENT DOCUMENTS

| | | | | |
|---|---|---|---|---|
| JP | 2008083492 | * | 4/2008 | ........ G02F 1/1333 |
| JP | 200808083492 | * | 4/2008 | ........ G02F 1/1333 |
| JP | 2012-173672 A | | 9/2012 | |
| JP | 2014-034631 A | | 2/2014 | |

* cited by examiner

Distance from end part of photo spacer (μm)

Distance from end part of photo spacer (μm)

Distance from end part of photo spacer (μm)

Distance from end part of photo spacer (μm)

Distance from end part of photo spacer (μm)

Distance from end part of photo spacer (μm)

Distance from end part of photo spacer (μm)

Distance from end part of photo spacer (μm)

LIQUID CRYSTAL DISPLAY PANEL AND LIQUID CRYSTAL DISPLAY DEVICE

TECHNICAL FIELD

The present invention relates to a liquid crystal display panel and a liquid crystal display device. The present invention particularly relates to a horizontal electric field mode liquid crystal display panel including a photo spacer, and a liquid crystal display device including the liquid crystal display panel.

BACKGROUND ART

Liquid crystal display panels have been used not only for televisions but also for smartphones, tablet PCs, car navigation systems, and the like. Various kinds of capabilities are requested for these applications, and for example, liquid crystal display panels supposed to be used at bright places such as outdoors have been disclosed (refer to Patent Literature 1 and Non Patent Literature 1, for example).

CITATION LIST

Patent Literature

Patent Literature 1: JP 2012-173672 A

Non Patent Literature

Non Patent Literature 1: Imayama et al., "Novel Pixel Design for a Transflective IPS-LCD with an In-Cell Retarder", SIDO7 DIGEST, 2007, pp. 1651 to 1654

SUMMARY OF INVENTION

Technical Problem

In some conventional liquid crystal display panels, a circular polarizing plate (laminated body of a linear polarizing plate and a λ/4 plate) is disposed on an observation surface side of a substrate provided on the observation surface side between paired substrates with a liquid crystal layer interposed therebetween to increase visibility at a bright place such as outdoor (reduce external light reflection). For example, in a known configuration, a vertical alignment (VA) mode liquid crystal display panel includes a circular polarizing plate, but the VA mode liquid crystal display panel has a viewing angle narrower than those of liquid crystal display panels of horizontal electric field modes such as the in-plane switching (IPS) mode and the fringe field switching (FFS) mode, and thus does not have wide applications. The liquid crystal display panel of a horizontal electric field mode such as the IPS mode or the FFS mode has an excellent viewing angle characteristic, and is difficult to be provided with a circular polarizing plate. This is because, when circular polarizing plates are disposed on the observation surface side and back surface side of the horizontal electric field mode liquid crystal display panel, the liquid crystal display panel is constantly in a white (bright) display state with no voltage application or with voltage application, and it is unable to achieve a black (dark) display state.

Patent Literature 1 and Non Patent Literature 1 each disclose a configuration in which a retarder (hereinafter also referred to as an in-cell retarder) is disposed on a liquid crystal layer side of a substrate on an observation surface side between paired substrates with a liquid crystal layer interposed therebetween. However, in the configurations disclosed in Patent Literature 1 and Non Patent Literature 1, when a substrate (for example, a color filter substrate), on a surface of which on the liquid crystal layer side a photo spacer is disposed is used as the substrate on the observation surface side, light leakage occurs in the vicinity of the photo spacer, which results in contrast ratio reduction in some cases.

The inventors of the present invention made various studies on this cause and found out the followings. The in-cell retarder is formed by, for example, applying a liquid crystalline photopolymerizable material (liquid crystalline photopolymerizable monomer) to the liquid crystal layer side surface of the substrate on the observation surface side. In this case, the thickness of the liquid crystalline photopolymerizable material increases as the position approaches the photo spacer from a pixel region. Thus, even when the retardation (product of the refractive index anisotropy and the thickness) of the in-cell retarder is set to an optimum value in the pixel region (region in which the liquid crystalline photopolymerizable material is applied flat), the retardation deviates from the optimum value in the vicinity of the photo spacer due to the increased thickness. Accordingly, the retardation applied by the in-cell retarder is largely different between the pixel region and the vicinity of the photo spacer, and thus light leakage occurs in the vicinity of the photo spacer when observed through the above-described circular polarizing plate, which results in contrast ratio reduction. When the liquid crystal display panel is viewed from the observation surface side, the photo spacer is normally hidden by a black matrix, but light leakage in the vicinity of the photo spacer cannot be hidden by the black matrix in a normal size and is visually recognized.

In view of the above state of the art, it is an object of the present invention to provide a horizontal electric field mode liquid crystal display panel having excellent visibility at a bright place and reduced light leakage in the vicinity of a photo spacer, and a liquid crystal display device including the liquid crystal display panel.

Solution to Problem

The present inventors made various discussions concerning a horizontal electric field mode liquid crystal display panel having excellent visibility at a bright place and reduced light leakage in the vicinity of a photo spacer, and consequently have noted a configuration in which a circular polarizing plate is disposed on an observation surface side and a retardation applied by an in-cell retarder is unlikely to change with the position. They found that, in a configuration in which a first λ/4 plate and a first polarizing plate are sequentially disposed on the observation surface side of a first substrate, which is the observation surface side substrate of paired substrates with a liquid crystal layer interposed therebetween, and a second λ/4 plate is disposed on the back surface side (liquid crystal layer side) of the first substrate: (1) a photo spacer is disposed only on a second substrate on the back surface side; and (2) photo spacers are disposed on both of the first substrate and the second substrate and the photo spacer of the first substrate has a height in a predetermined range. These findings have now led to completion of the present invention capable of solving the above-described problem.

Specifically, an aspect of the present invention may be a liquid crystal display panel (hereinafter also referred to as a first liquid crystal display panel according to the present invention) including, sequentially from an observation surface side toward a back surface side: a first polarizing plate; a first λ/4 plate; a first substrate; a second λ/4 plate; a liquid crystal layer; a second substrate; and a second polarizing plate. One of the first substrate and the second substrate includes a pair of electrodes configured to generate a horizontal electric field at the liquid crystal layer upon voltage application. The first substrate includes a black matrix but no photo spacer. The second substrate includes a photo spacer overlapping with the black matrix. Liquid crystal molecules in the liquid crystal layer homogeneously align with no voltage application between the electrodes. The second λ/4 plate covers no side surface of the photo spacer. The in-plane slow axis of the first λ/4 plate forms an angle of 45° with the transmission axis of the first polarizing plate and is orthogonal to the in-plane slow axis of the second λ/4 plate.

Another aspect of the present invention may be a liquid crystal display panel (hereinafter also referred to as a second liquid crystal display panel according to the present invention) including, sequentially from an observation surface side toward a back surface side: a first polarizing plate; a first λ/4 plate; a first substrate; a second λ/4 plate; a liquid crystal layer; a second substrate; and a second polarizing plate. One of the first substrate and the second substrate includes a pair of electrodes configured to generate a horizontal electric field at the liquid crystal layer upon voltage application. The first substrate includes a black matrix, and a first photo spacer disposed on the back surface side of the black matrix and overlapping with the black matrix. The second substrate includes a second photo spacer overlapping with the first photo spacer. Liquid crystal molecules in the liquid crystal layer homogeneously align with no voltage application between the electrodes. The second λ/4 plate includes a flat part having a flat surface on the back surface side, and covers a side surface of the first photo spacer but not a side surface of the second photo spacer. The height of the first photo spacer is larger than the thickness of the flat part of the second λ/4 plate by 0.2 to 2.0 μm. The in-plane slow axis of the first λ/4 plate forms an angle of 45° with the transmission axis of the first polarizing plate and is orthogonal to the in-plane slow axis of the second λ/4 plate.

Yet another aspect of the present invention may be a liquid crystal display device including the liquid crystal display panel (the first liquid crystal display panel according to the present invention or the second liquid crystal display panel according to the present invention).

Advantageous Effects of Invention

The present invention provides a horizontal electric field mode liquid crystal display panel having excellent visibility at a bright place and reduced light leakage in the vicinity of a photo spacer, and a liquid crystal display device including the liquid crystal display panel.

DESCRIPTION OF EMBODIMENTS

Embodiments of the present invention will be described further in detail below with reference to the accompanying drawings, but the present invention is not limited to these embodiments. Configurations of the embodiments may be combined or changed as appropriate without departing from the scope of the present invention.

In the present specification, a "polarizing plate" without "linear" means a linear polarizing plate and is distinguished from a circular polarizing plate.

In the present specification, a λ/4 plate means a retarder that provides an in-plane retardation of ¼ wavelength (137.5 nm, precisely) to at least light having a wavelength of 550 nm, and includes a retarder that provides an in-plane retardation of 100 nm or more and 176 nm or less. Light having a wavelength of 550 nm is light of a wavelength at which a human has highest visual sensitivity.

In the present specification, an in-plane retardation (R) is defined to be R=(ns−nf)×D. When nx and ny are defined to be the principal refractive indexes of a retarder (including a λ/4 plate) in the in-plane direction, ns represents the larger one of nx and ny, and nf represents the smaller one. The in-plane slow axis is an axis in the direction corresponding to ns, and the in-plane fast axis is an axis in the direction corresponding to nf. The thickness of the retarder is represented by D.

In the present specification, the retardation of a liquid crystal layer means the maximum value of an effective retardation provided by the liquid crystal layer, and is defined to be Δn×d where Δn and d represent the refractive index anisotropy and thickness of the liquid crystal layer, respectively.

In the present specification, when two axes (directions) are orthogonal to each other, the angle (absolute value) between the axes is in the range of 90±3°, preferably in the range of 90±1°, more preferably in the range of 90±0.5°, particularly preferably equal to 90° (completely orthogonal to each other). When two axes (directions) are parallel to each other, the angle (absolute value) between the axes is in the range of 0±3°, preferably in the range of 0±1°, more preferably in the range of 0±0.5°, particularly preferably equal to 0° (completely parallel to each other). When two axes (directions) form an angle of 45°, the angle (absolute value) between the axes is in the range of 45±3°, preferably in the range of 45±1°, more preferably in the range of 45±0.5°, particularly preferably equal to 45° (perfect 45°).

Embodiment 1

Embodiment 1 relates to a first liquid crystal display panel according to the present invention, and a liquid crystal display device including the first liquid crystal display panel according to the present invention.

Figure 1:
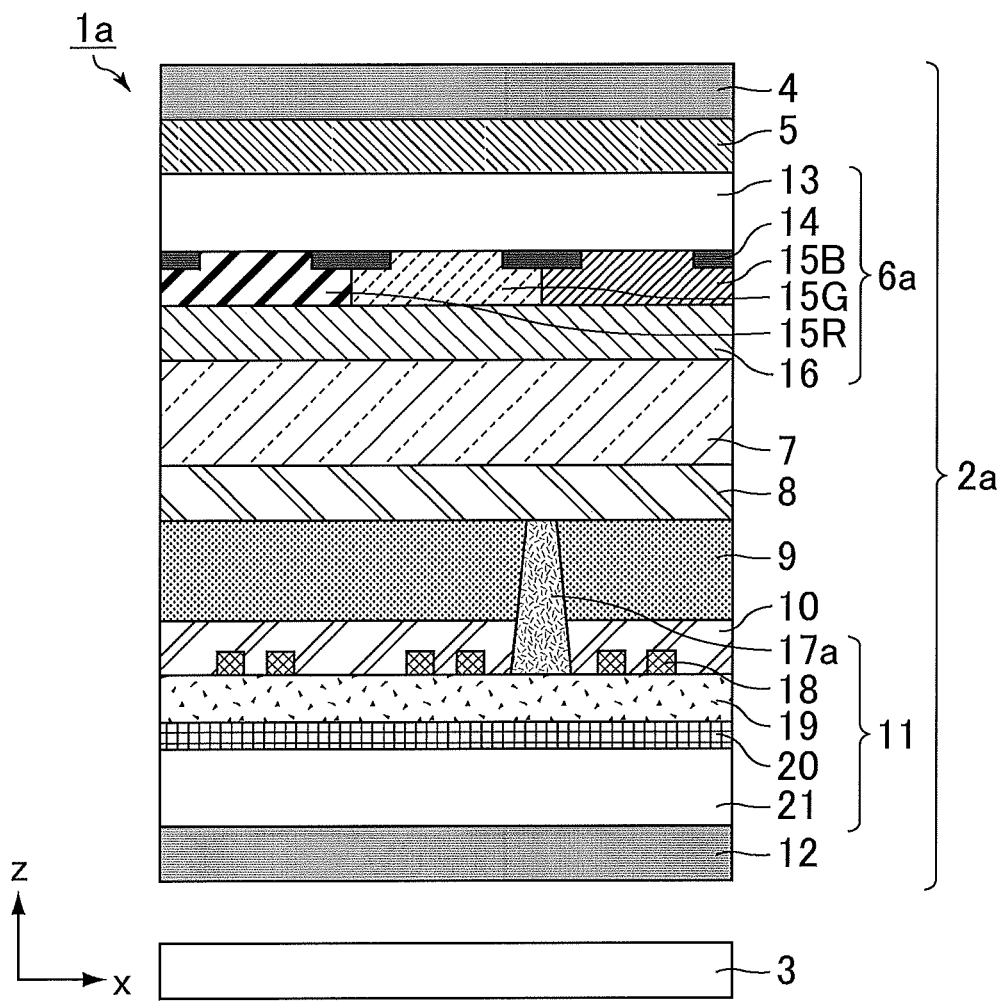
FIG. 1 is a schematic cross-sectional view illustrating a liquid crystal display device according to Embodiment 1.

FIG. 1 is a schematic cross-sectional view illustrating a liquid crystal display device according to Embodiment 1. As illustrated in FIG. 1, this liquid crystal display device 1a includes a liquid crystal display panel 2a and a backlight 3 sequentially from an observation surface side toward a back surface side.

The type of the backlight 3 is not limited, and an edge-lit type or direct-lit type backlight may be employed, for example. The type of a light source of the backlight 3 is not limited, but may be, for example, a light-emitting diode (LED) or a cold cathode fluorescent lamp (CCFL).

The liquid crystal display panel 2a includes sequentially from the observation surface side toward the back surface side, a first polarizing plate 4, a first λ/4 plate 5, a first substrate 6a, a second λ/4 plate 7, a first alignment film 8, a liquid crystal layer 9, a second alignment film 10, a second substrate 11, and a second polarizing plate 12.

The first polarizing plate 4 and the second polarizing plate 12 may be each, for example, a polarizer (absorption polarizing plate) obtained by causing an anisotropic material such as iodine complex (or dye) to dye and adsorb on a polyvinyl alcohol (PVA) film and then stretching and aligning the film.

The first polarizing plate 4 and the second polarizing plate 12 preferably have transmission axes orthogonal to each other. With this configuration, the first polarizing plate 4 and the second polarizing plate 12 are disposed in crossed Nicols, and thus a preferable black display state can be achieved with no voltage application.

The first substrate 6a includes a black matrix 14 but no photo spacer. FIG. 1 exemplarily illustrates a case in which the first substrate 6a is a color filter substrate.

The first substrate 6a includes a first support substrate 13, the black matrix 14 disposed on a surface of the first support substrate 13 on the back surface side, color filter layers 15R (red), 15G (green), and 15B (blue) covering the black matrix 14, and an overcoat layer 16 covering the color filter layers 15R, 15G, and 15B.

The first support substrate 13 is, for example, a glass substrate or a plastic substrate.

The black matrix 14 is made of, for example, a black resist having a light shielding ratio of 99.9% or higher (an OD value of 3.0 or larger).

The color filter layers 15R, 15G, and 15B are made of, for example, a pigment dispersion type color resist. The color filter layers are not limited to a particular color combination, but may be, for example, a combination of red, green, and blue as illustrated in FIG. 1, or a combination of red, green, blue, and yellow.

The overcoat layer 16 is made of, for example, transparent resin having high thermal and chemical resistance.

One of the first substrate 6a and the second substrate 11 includes a pair of electrodes configured to generate a horizontal electric field at the liquid crystal layer 9 upon voltage application. FIG. 1 exemplarily illustrates a case in which the second substrate 11 is an FFS mode thin-film transistor array substrate.

The second substrate 11 includes a second support substrate 21, a common electrode 20 disposed on a surface of the second support substrate 21 on the observation surface side, an insulating film 19 covering the common electrode 20, a pixel electrode (signal electrode) 18 disposed on a surface of the insulating film 19 on the observation surface side, and a photo spacer 17a disposed at a position different from that of the pixel electrode 18 on the surface of the insulating film 19 on the observation surface side. The photo spacer 17a overlaps with the black matrix 14. With this configuration, when the liquid crystal display panel 2a is viewed from the observation surface side, the photo spacer 17a is hidden by the black matrix 14 and not visually recognized. When voltage is applied between the common electrode 20 and the pixel electrode 18 (upon voltage application), a horizontal electric field (fringe electric field) is generated at the liquid crystal layer 9 so that alignment of liquid crystal molecules in the liquid crystal layer 9 can be controlled.

The second support substrate 21 is, for example, a glass substrate or a plastic substrate.

The common electrode 20 is a planar electrode. The material of the common electrode 20 is, for example, indium tin oxide (ITO) or indium zinc oxide (IZO).

The insulating film 19 is, for example, an organic insulating film or a nitride film.

The pixel electrode 18 is an electrode provided with a slit. The material of the pixel electrode 18 is, for example, indium tin oxide (ITO) or indium zinc oxide (IZO).

The photo spacer 17a provides a gap (cell gap) between the first substrate 6a and the second substrate 11. The photo spacer 17a is made of, for example, a resist. The height of the photo spacer 17a is set as appropriate with taken into account the thickness of the liquid crystal layer 9 (more precisely, the thickness of the second alignment film 10 as well). The sectional shape of the photo spacer 17a is not limited but may be, for example, a shape thickening from the back surface side toward the observation surface side or a shape having a constant width in addition to a shape narrowing from the back surface side toward the observation surface side as illustrated in FIG. 1.

The case in which the second substrate 11 is an FFS mode thin-film transistor array substrate is exemplarily described above. In an IPS mode thin-film transistor array substrate in the same horizontal electric field mode, when voltage is applied between paired comb teeth electrodes (upon voltage application), a horizontal electric field is generated at the liquid crystal layer 9 so that alignment of the liquid crystal molecules in the liquid crystal layer 9 can be controlled.

The liquid crystal molecules in the liquid crystal layer 9 homogeneously align when no voltage is applied between the electrodes included in one of the first substrate 6a and the second substrate 11 (in FIG. 1, between the common electrode 20 and the pixel electrode 18) (with no voltage application). The liquid crystal layer 9 is made of, for example, a negative type liquid crystal material having negative anisotropy of dielectric constant ($\Delta\varepsilon<0$).

The second λ/4 plate 7 may be made of a self-assembling photo alignment material containing a photo functional group capable of causing at least one chemical reaction selected from the group consisting of photodimerization, photoisomerization, and photo-Fries rearrangement. In the self-assembling photo alignment material, the alignment property of the photo functional group is improved by the following method. First, the self-assembling photo alignment material is applied to a substrate (for example, the first substrate 6a) to form a photo alignment material film. Then, the photo alignment material film is pre-baked. Subsequently, the pre-baked photo alignment material film is irradiated with light (for example, polarized ultraviolet) to cause chemical reaction (at least one chemical reaction selected from the group consisting of photodimerization, photoisomerization, and photo-Fries rearrangement) of the photo functional group. Lastly, the photo alignment material film subjected to the light irradiation is post-baked at a temperature higher than that of the pre-baking so that the alignment property of the photo functional group is improved through the chemical reaction caused by the light irradiation. The refractive index anisotropy of the self-assembling photo alignment material is determined mainly in accordance with the light irradiation and post-baking processes (for example, the amount of the light irradiation and the temperature of the post-baking).

Examples of photo functional groups capable of causing photodimerization and photoisomerization include a cinnamate group, a chalcone group, a coumarin group, and a stilbene group.

Examples of photo functional groups capable of causing photoisomerization include an azobenzene group.

Examples of photo functional groups capable of causing photo-Fries rearrangement include a phenol ester group.

Examples of the main skeleton of the self-assembling photo alignment material (solid content) include polyamic acid, polyimide, acrylic, methacrylic, maleimide, and polysiloxane structures.

The self-assembling photo alignment material functions as an alignment film for defining the alignment direction of the liquid crystal molecules, and also functions as a retarder (including a λ/4 plate). Table 1 exemplarily lists in-plane retardations developed by alignment materials (solid contents). In Table 1, each in-plane retardation is a value for light having a wavelength of 550 nm when the thickness, of an alignment material is 100 nm. As indicated in Table 1, alignment materials E, F, G, and H develop in-plane retardations larger than those of alignment materials A, B, C, and D, and each function as a retarder (including a λ/4 plate) by increasing the thickness thereof (to, for example, 1 μm or larger). In other words, the alignment materials E, F, G, and H are self-assembling photo alignment materials.

TABLE 1

| | Alignment type | Post-baking after light irradiation | In-plane retardation (nm) |
| --- | --- | --- | --- |
| Alignment material A | Rubbing type | No | 0.1 |
| Alignment material B | Photolytic type | No | 0.8 |
| Alignment material C | Photolytic type | Yes | 0.5 |
| Alignment material D | Photoisomerization type | No | 0.1 |
| Alignment material E | Photoisomerization type | Yes | 1.8 |
| Alignment material F | Photoisomerization type | Yes | 15 |
| Alignment material G | Photo-Fries rearrangement type | Yes | 5 |
| Alignment material H | Photo-Fries rearrangement type | Yes | 21 |

The second λ/4 plate 7 may be made of a liquid crystalline photopolymerizable material (liquid crystalline photopolymerizable monomer). The structure of the liquid crystalline photopolymerizable material is, for example, a structure that includes a mesogenic group containing two or more benzene rings or cyclohexane rings and further includes a photopolymerizable group made of an acrylate group or a methacrylate group at one or both of ends of the mesogenic group. The liquid crystalline photopolymerizable material functions as a λ/4 plate by the following method. First, an alignment film for the second λ/4 plate 7 and the liquid crystalline photopolymerizable material are sequentially applied to a surface of the first substrate 6a on the back surface side to form a multilayer film. Thereafter, the multilayer film is sequentially baked and irradiated with light (for example, ultraviolet) so that the liquid crystalline photopolymerizable material functions as the second λ/4 plate 7. Unlike a self-assembling photo alignment material, the liquid crystalline photopolymerizable material does not have refractive index anisotropy determined mainly in accordance with the baking and light irradiation processes but is a liquid crystal material having unique refractive index anisotropy.

The second λ/4 plate 7 does not cover a side surface of the photo spacer 17a. Such a state is achieved by bonding a layer prepared by forming the second λ/4 plate 7 and the first alignment film 8 sequentially on the surface of the first substrate 6a on the back surface side, and a layer prepared by forming the second alignment film 10 on a surface of the second substrate 11 on the observation surface side on which the photo spacer 17a is disposed, with the liquid crystal layer 9 interposed between the layers. With such a state, no variance due to the photo spacer 17a occurs to the thickness and in-plane retardation of the second λ/4 plate 7, which leads to reduced light leakage in the vicinity of the photo spacer 17a. However, when the photo spacer 17a is formed only on the first substrate 6a unlike the present embodiment, the second λ/4 plate 7 is formed by applying an alignment material to the surface of the first substrate 6a on the back surface side, and thus covers the side surface of the photo spacer 17a.

The first λ/4 plate 5 can be obtained by applying the same material as that of the second λ/4 plate 7 to a surface of a substrate by the same method as that for the second λ/4 plate 7, and be bonded on a surface of the first substrate 6a (first support substrate 13) on the observation surface side through a bonding agent or the like.

The in-plane slow axis of the first λ/4 plate 5 and the transmission axis of the first polarizing plate 4 form an angle of 45°. With this configuration, a circular polarizing plate in which the first polarizing plate 4 and the first λ/4 plate 5 are stacked is disposed on the observation surface side of the liquid crystal display panel 2a. With this configuration, incident light from the observation surface side of the liquid crystal display panel 2a is converted into circularly polarized light when transmitting through the circular polarizing plate and then reaches the first substrate 6a. Accordingly, reflection from the first substrate 6a (layer disposed on the observation surface side of the overcoat layer 16) is reduced due to the effect of reflection reduction by the circular polarizing plate, which leads to increased visibility at a bright place. When the first polarizing plate 4 and the first λ/4 plate 5 are stacked to form the circular polarizing plate, a roll-to-roll scheme is preferably used to increase manufacturing efficiency.

The in-plane slow axis of the first λ/4 plate 5 and the in-plane slow axis of the second λ/4 plate 7 are orthogonal to each other. With this configuration, the first λ/4 plate 5 and the second λ/4 plate 7 can cancel retardations thereof for light incident from the back surface side of the liquid crystal display panel 2a, thereby achieving an optical state in which both plates substantially do not exist. In other words, a configuration optically equivalent to that of a conventional horizontal electric field mode liquid crystal display panel is achieved for light incident on the liquid crystal display panel 2a from the backlight 3. Thus, display can be achieved in the horizontal electric field mode using the circular polarizing plate. The first λ/4 plate 5 and the second λ/4 plate 7 are preferably made of an identical material. With this, the first λ/4 plate 5 and the second λ/4 plate 7 can cancel retardations thereof including wavelength dispersion.

The alignment direction of the liquid crystal molecules in the liquid crystal layer 9 and the transmission axis of one of the first polarizing plate 4 and the second polarizing plate 12 are preferably parallel to each other when no voltage is applied between the electrodes (in FIG. 1, between the common electrode 20 and the pixel electrode 18) included in one of the first substrate 6a and the second substrate 11 (with no voltage application). With this configuration, a preferable black display state can be achieved with no voltage application.

The first alignment film 8 may be disposed on a surface of the second λ/4 plate 7 on the back surface side as illustrated in FIG. 1. The first alignment film 8 is preferably made of an alignment material as described below.

The alignment material of the first alignment film 8 preferably contains a solid content that can be baked (post-baked) at a temperature equal to or lower than the temperature of the baking (post-baking) at the formation of the second λ/4 plate 7. When the first alignment film 8 is formed through baking (post-baking) at a temperature higher than the temperature of the baking (post-baking) at the formation of the second λ/4 plate 7, an in-plane retardation developed to the second λ/4 plate 7 potentially largely decreases and does not function as a λ/4 plate. For this reason, the alignment material of the first alignment film 8 and the alignment material of the second λ/4 plate 7 preferably contain the same solid content.

With this, the same temperature can be employed at the baking (post-baking) to form the second λ/4 plate 7 and the first alignment film 8. Thus, when the second λ/4 plate 7 and the first alignment film 8 are formed, the baking (post-baking) can be performed by the same device without changing temperature settings, which leads to an increased manufacture efficiency. In addition, the first alignment film 8 can be formed through the same process as that for the second λ/4 plate 7. For example, when the second λ/4 plate 7 is made of the self-assembling photo alignment material, the first alignment film 8 can be formed by applying the alignment material of the first alignment film 8 to the surface of the second λ/4 plate 7 on the back surface side, and then sequentially performing pre-baking, light irradiation, and post-baking. In this case, not only the post-baking temperature but also conditions such as the pre-baking temperature and the light irradiation amount can be the same as those for the process of forming the second λ/4 plate 7. The light irradiation to form the first alignment film 8 does not affect characteristics of the second λ/4 plate 7. This is because the second λ/4 plate 7 is post-baked in advance, and thus the alignment of molecules in the second λ/4 plate 7 is fixed by thermal polymerization.

The alignment material of the first alignment film 8 and the alignment material of the second λ/4 plate 7 preferably contain solvents different from each other. When the alignment material of the first alignment film 8 contains the same solvent as the alignment material of the second λ/4 plate 7, the second λ/4 plate 7 formed in advance potentially melts through formation of the first alignment film 8. For example, when the alignment material of the second λ/4 plate 7 contains N-methyl-2-pyrrolidone (NMP) as a solvent, the alignment material of the first alignment film 8 preferably contains a solvent other than N-methyl-2-pyrrolidone.

The second alignment film 10 may be disposed on a surface of the second substrate 11 on the observation surface side as illustrated in FIG. 1. The second alignment film 10 may be formed by using the same material and method as those for the first alignment film 8. The second alignment film 10 may cover the side surface of the photo spacer 17a. The second alignment film 10 may cover a surface of the photo spacer 17a on the observation surface side (in FIG. 1, a surface on the first alignment film 8 side) in addition to the side surface thereof.

According to Embodiment 1, the following effects can be achieved.

(1) Since the circular polarizing plate in which the first polarizing plate 4 and the first λ/4 plate 5 are stacked is disposed on the observation surface side of the liquid crystal display panel 2a, increased visibility at a bright place is achieved by the effect of reflection prevention by the circular polarizing plate.

(2) Since the first substrate 6a includes no photo spacer, no variance occurs to the thickness and in-plane retardation of the second λ/4 plate 7, which leads to reduced light leakage in the vicinity of the photo spacer 17a.

Embodiment 2

Embodiment 2 relates to the second liquid crystal display panel according to the present invention described above, and a liquid crystal display device including the second liquid crystal display panel according to the present invention described above. Embodiment 2 is the same as Embodiment 1 except that the first substrate and the second substrate each include a photo spacer, and thus any duplicate description thereof will be omitted as appropriate.

Figure 2:
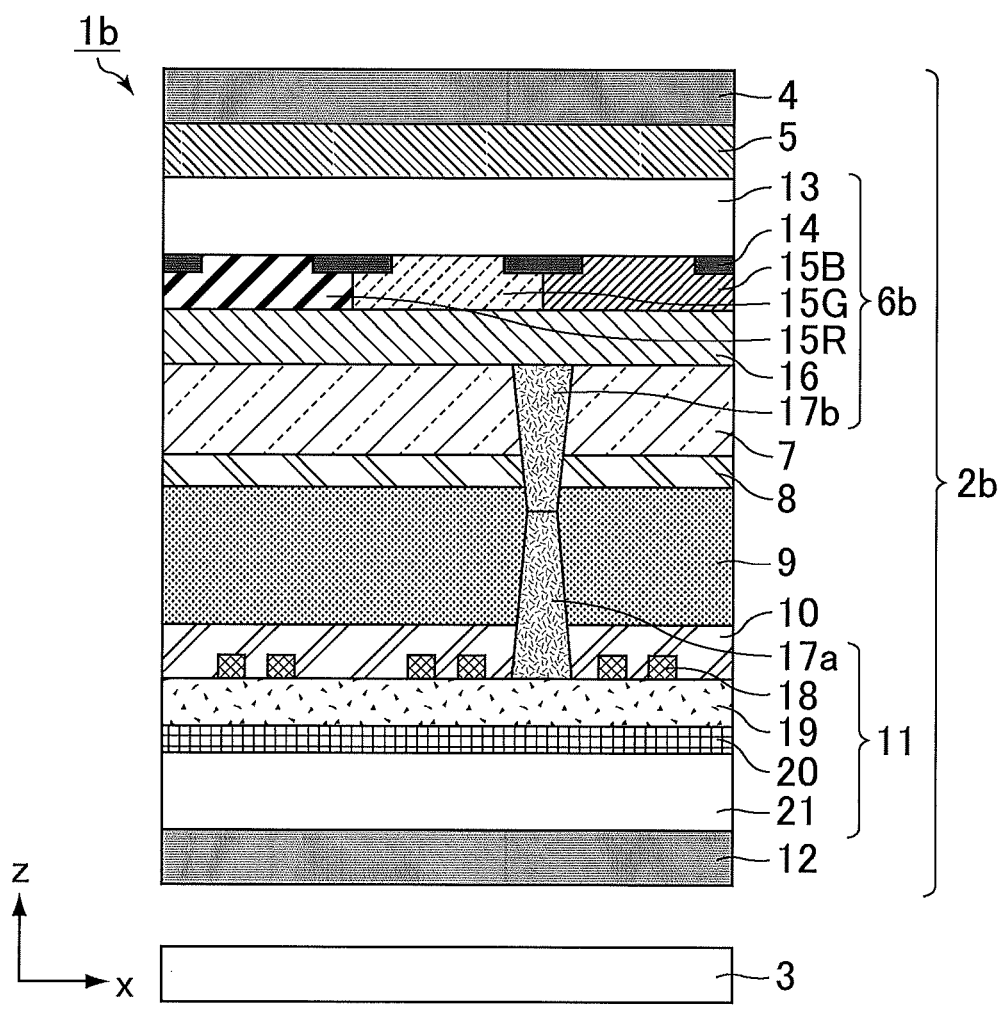
FIG. 2 is a schematic cross-sectional view illustrating a liquid crystal display device according to Embodiment 2.

FIG. 2 is a schematic cross-sectional view illustrating a liquid crystal display device according to Embodiment 2. As illustrated in FIG. 2, this liquid crystal display device 1b includes a liquid crystal display panel 2b and the backlight 3 sequentially from the observation surface side toward the back surface side.

The liquid crystal display panel 2b includes, sequentially from the observation surface side toward the back surface side, the first polarizing plate 4, the first λ/4 plate 5, a first substrate 6b, the second λ/4 plate 7, the first alignment film 8, the liquid crystal layer 9, the second alignment film 10, the second substrate 11, and the second polarizing plate 12.

The first substrate 6b includes a black matrix 14, and a photo spacer 17b (first photo spacer) disposed on the back surface side of the black matrix 14 and overlapping with the black matrix 14. FIG. 2 exemplarily illustrates a case in which the first substrate 6b is a color filter substrate.

The first substrate 6b includes a first support substrate 13, a black matrix 14 disposed on a surface of the first support substrate 13 on the back surface side, color filter layers 15R (red), 15G (green), and 15B (blue) covering the black matrix 14, an overcoat layer 16 covering the color filter layers 15R, 15G, and 15B, and a photo spacer 17b disposed on a surface of the overcoat layer 16 on the back surface side. The photo spacer 17b overlaps with the black matrix 14. With this configuration, when the liquid crystal display panel 2b is viewed from the observation surface side, the photo spacer 17b is hidden by the black matrix 14 and not visually recognized.

The photo spacer 17b provides, together with the photo spacer 17a to be described later, a gap (cell gap) between the first substrate 6b and the second substrate 11. The photo spacer 17b is made of, for example, a resist. The sectional shape of the photo spacer 17b is not limited but may be, for example, a shape thickening from the observation surface side toward the back surface side or a shape having a constant width in addition to a shape narrowing from the observation surface side toward the back surface side as illustrated in FIG. 2.

One of the first substrate 6b and the second substrate 11 includes a pair of electrodes configured to generate a horizontal electric field at the liquid crystal layer 9 upon voltage application. FIG. 2 exemplarily illustrates a case in which the second substrate 11 is an FFS mode thin-film transistor array substrate.

The second substrate 11 includes the second support substrate 21, the common electrode 20 disposed on the surface of the second support substrate 21 on the observation surface side, the insulating film 19 covering the common electrode 20, the pixel electrode (signal electrode) 18 disposed on the surface of the insulating film 19 on the observation surface side, and the photo spacer 17a (second photo spacer) disposed at the position different from that of the pixel electrode 18 on the surface of the insulating film 19 on the observation surface side. The photo spacer 17a overlaps with the photo spacer 17b. The photo spacer 17a and the photo spacer 17b may be in direct contact with each other. With the above-described configuration, when the liquid crystal display panel 2b is viewed from the observation surface side, the photo spacer 17a together with the photo spacer 17b are hidden by the black matrix 14 and not visually recognized. When voltage is applied between the common electrode 20 and the pixel electrode 18 (upon voltage application), a horizontal electric field (fringe electric field) is generated at the liquid crystal layer 9 so that alignment of liquid crystal molecules in the liquid crystal layer 9 can be controlled.

The second λ/4 plate 7 includes a flat part having a flat surface on the back surface side. The flat part of the second λ/4 plate 7 is a part at which no variance occurs to the thickness thereof, preferably disposed in the pixel region, and preferably corresponds to a part disposed in a region separated from an end part of the photo spacer 17b by 14 μm or more.

The second λ/4 plate 7 covers a side surface of the photo spacer 17b but not the side surface of the photo spacer 17a. Such a state is achieved by bonding a layer prepared by forming the second λ/4 plate 7 and the first alignment film 8 sequentially on a surface of the first substrate 6b on the back surface side on which the photo spacer 17b is disposed, and a layer prepared by forming the second alignment film 10 on the surface of the second substrate 11 on the observation surface side on which the photo spacer 17a is disposed, with the liquid crystal layer 9 interposed between the layers. The second λ/4 plate 7 only needs to cover at least part of the side surface of the photo spacer 17b. The second λ/4 plate 7 may cover a surface of the photo spacer 17b on the back surface side (in FIG. 2, a surface on the second alignment film 10 side) in addition to the side surface thereof.

The height of the photo spacer 17b is larger than the thickness of the flat part of the second λ/4 plate 7 by 0.2 to 2.0 μm. With this configuration, the height of the photo spacer 17b is set to be small, which leads to reduction of variance in the thickness of the second λ/4 plate 7 due to the photo spacer 17b, in other words, reduction of variance in the in-plane retardation of the second λ/4 plate 7. As a result, light leakage can be reduced in the vicinity of the photo spacer 17b. In the present embodiment, since the photo spacer 17a is disposed in addition to the photo spacer 17b, the gap (cell gap) between the first substrate 6b and the second substrate 11 can be adjusted as appropriate by combining the photo spacer 17b with the photo spacer 17a when the photo spacer 17b has a reduced height. When the height of the photo spacer 17b is smaller than the lower limit value of the range, it is difficult to maintain the gap between the first substrate 6b and the second substrate 11. When the height of the photo spacer 17b is larger than the upper limit value of the range, variance in the thickness of the second λ/4 plate 7 due to the photo spacer 17b increases, and as a result, the in-plane retardation of the second λ/4 plate 7 largely differs between the pixel region and the vicinity of the photo spacer 17b.

According to Embodiment 2, the following effects can be achieved.

(1) Since the circular polarizing plate in which the first polarizing plate 4 and the first λ/4 plate 5 are stacked is disposed on the observation surface side of the liquid crystal display panel 2b, increased visibility at a bright place is achieved by the effect of reflection prevention by the circular polarizing plate.

(2) Since the height of the photo spacer 17b is small, variance in the thickness and in-plane retardation of the second λ/4 plate 7 is reduced, and light leakage can be reduced in the vicinity of the photo spacer 17b.

The present invention will be described in more detail below with reference to examples and comparative examples, but is not limited to these examples.

In each example, the in-plane retardation of a λ/4 plate and the retardation of a liquid crystal layer are measured for a wavelength of 550 nm. The azimuth of a transmission axis, the azimuth of an in-plane slow axis, and an alignment direction are defined to be positive (+) in an anticlockwise manner relative to the longitudinal direction (long side; the x direction in the figures) of a liquid crystal display panel (at 0°).

Example 1

A liquid crystal display panel according to Embodiment 1 was produced. Components of a liquid crystal display panel according to Example 1 were as follows.

(First Polarizing Plate 4)

A polarizer (absorptive polarizing plate) obtained by stretching and aligning a polyvinyl alcohol film that an iodine complex (or a dye) dyes and adsorbs on was used. The azimuth of the transmission axis was 90°.

(First λ/4 Plate 5)

A λ/4 plate produced by the following method was used. First, a photolytic type alignment film for the first λ/4 plate 5 and a liquid crystalline photopolymerizable material were sequentially applied to a surface of a polyethylene terephthalate (PET) film to form a multilayer film. Then, the multilayer film was baked at 65° C. for 1 minute and then irradiated with ultraviolet (irradiation amount: 500 mJ). As a result, the first λ/4 plate 5 was obtained. The thickness thereof was 1.50 µm. The in-plane retardation thereof was 137.5 nm. The azimuth of the slow axis thereof was 45°. In the present example, the first λ/4 plate 5 was bonded to the surface of the first substrate 6a (first support substrate 13) on the observation surface side through a bonding agent.

(First Substrate 6a)

A color filter substrate as illustrated in FIG. 1 was used. The first support substrate 13 was a glass substrate having a thickness of 0.7 mm. The black matrix 14 was made of a black resist (light shielding ratio: 99.9%). The color filter layers 15R, 15G, and 15B were made of a pigment dispersion type color resist. The overcoat layer 16 was made of a transparent resin.

(Second λ/4 Plate 7)

A λ/4 plate produced by the following method was used. First, a photolytic type alignment film for the second λ/4 plate 7 and the liquid crystalline photopolymerizable material were sequentially applied to a surface of the first substrate 6a on the back surface side to form a multilayer film. Then, the multilayer film was baked at 65° C. for 1 minute and then irradiated with ultraviolet (irradiation amount: 500 mJ). As a result, the second λ/4 plate 7 was obtained. The second λ/4 plate 7 was designed so that the in-plane retardation is 137.5 nm when the thickness thereof is 1.50 µm. The azimuth of the slow axis was −45°.

(First Alignment Film 8)

An alignment film produced by the following method was used. First, a polyimide alignment material was applied to a surface of the second λ/4 plate 7 on the back surface side to form an alignment material film. Then, the alignment material film was pre-baked at 90° C. for 2 minutes and then post-baked at 220° C. for 40 minutes. As a result, the first alignment film 8 was obtained. The thickness was 100 nm. The first alignment film 8 was subjected to rubbing treatment to define the alignment direction of liquid crystal molecules in the liquid crystal layer 9.

(Liquid Crystal Layer 9)

A Liquid crystal layer made of a negative type liquid crystal material having negative anisotropy of dielectric constant (Δε=−4.0) was used. The refractive index anisotropy (Δn) thereof was 0.095. The thickness thereof was 3.3 µm. The retardation thereof was 300 nm. The alignment direction of the liquid crystal molecules in the liquid crystal layer 9 (with no voltage application) was 0°.

(Second Alignment Film 10)

An alignment film produced by the following method was used. First, a polyimide alignment material was applied to a surface of the second substrate 11 on the observation surface side (photo spacer 17a side) to form an alignment material film. Then, the alignment material film was pre-baked at 90° C. for 2 minutes and then post-baked at 220° C. for 40 minutes. As a result, the second alignment film 10 was obtained. The thickness was 100 nm. The second alignment film 10 was subjected to rubbing treatment to define the alignment direction of the liquid crystal molecules in the liquid crystal layer 9.

(Second Substrate 11)

An FFS mode thin-film transistor array substrate as illustrated in FIG. 1 was used. The second support substrate 21 was a glass substrate having a thickness of 0.7 mm. The common electrode 20 was made of indium zinc oxide (IZO). The insulating film 19 was made of silicon nitride (SiN). The thickness of the insulating film 19 was 300 nm. The pixel electrode 18 was made of indium zinc oxide (IZO). The photo spacer 17a was made of a resist. The height of the photo spacer 17a was 3.3 µm.

(Second Polarizing Plate 12)

A polarizer (absorptive polarizing plate) obtained by stretching and aligning a polyvinyl alcohol film that an iodine complex (or a dye) dyes and adsorbs on was used. The azimuth of the transmission axis was 0°.

Figure 3:
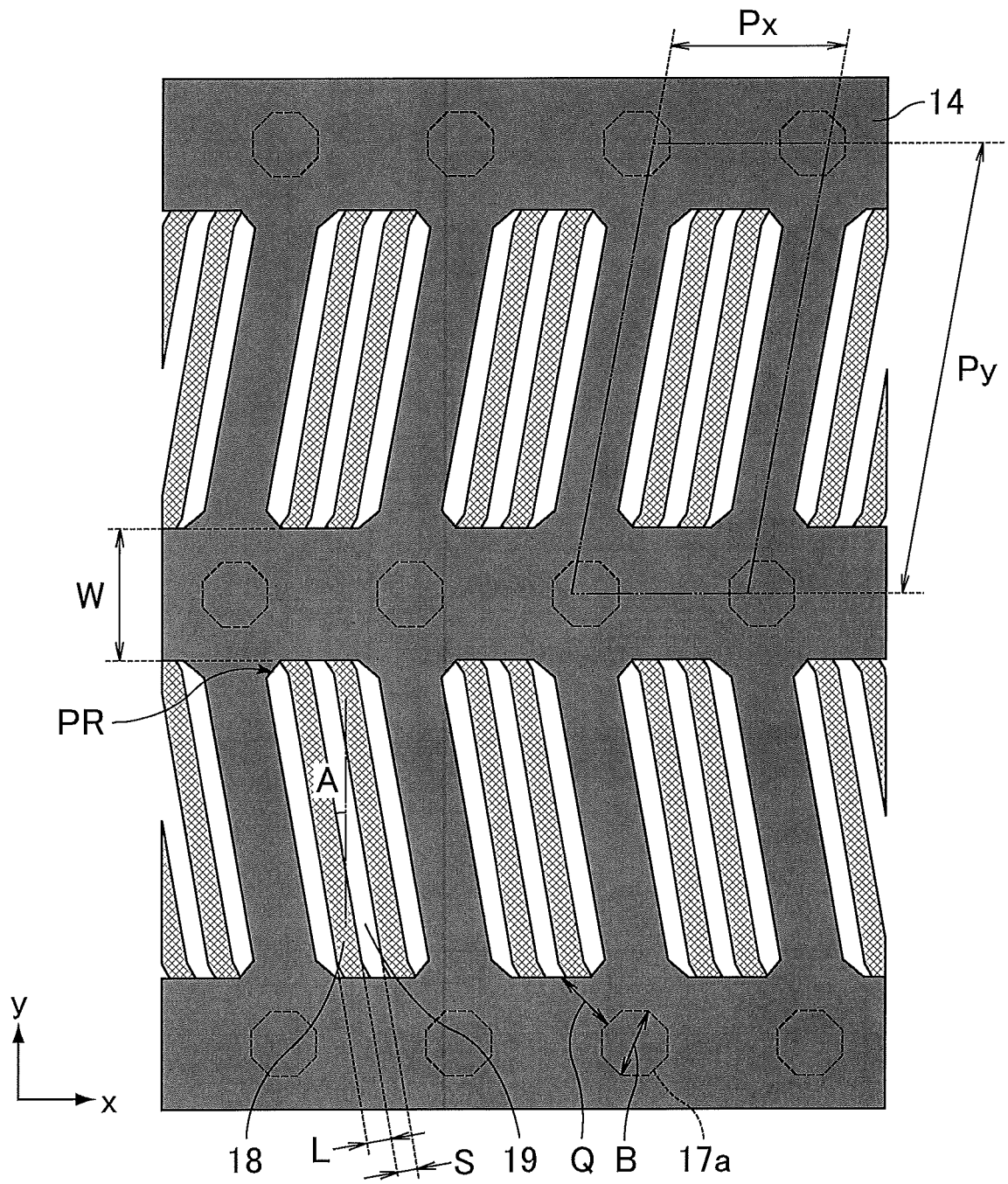
FIG. 3 is a schematic plan view illustrating a pixel structure of a liquid crystal display panel according to Example 1.

The following describes a pixel structure of the liquid crystal display panel according to Example 1 with reference to FIG. 3. FIG. 3 is a schematic plan view illustrating the pixel structure of the liquid crystal display panel according to Example 1. FIG. 3 illustrates a diagram focused on the black matrix 14, the photo spacer 17a, and the pixel electrode 18 when the liquid crystal display panel in FIG. 1 is viewed from the observation surface side. As illustrated in FIG. 3, a plurality of regions (openings) partitioned by the black matrix 14 each correspond to a pixel region PR. The pixel electrode 18 (width: L) provided with a slit (width: S) is disposed in the pixel region PR so that image display is performed by controlling voltage (signal voltage) input through a thin-film transistor. In the present example, the width L of the pixel electrode 18 was 2.5 µm. The width S of the slit (the interval of the pixel electrode 18) was 3.0 µm.

The direction of rotation of the liquid crystal molecules in the liquid crystal layer 9 is defined to be one direction by the pixel electrode 18 upon voltage application. Specifically, the long axis of each liquid crystal molecule is tilted by A (the tilt angle of the pixel electrode 18) relative to the y direction in FIG. 3 upon voltage application. In the present example, the tilt angle A of the pixel electrode 18 was 10°. Each liquid crystal molecule in the liquid crystal layer 9 was aligned so that the long axis was along the x direction in FIG. 3 (0°) with no voltage application. The plane shape of the pixel electrode 18 in the pixel region PR arranged on an odd-numbered row and the plane shape of the pixel electrode 18 in the pixel region PR arranged on an even-numbered row adjacent to the odd-numbered row were line-symmetric with respect to the x direction in FIG. 3 to improve the viewing angle characteristic.

The photo spacer 17a (diameter: B) was disposed at pitches Px and Py to be hidden by the black matrix 14 (width: W) and was disposed so that the shortest distance to the pixel region PR (shortest distance between an end part of the photo spacer 17a and an end part of the pixel region PR) was Q. In the present example, the width W of the black matrix 14 was 20 µm. The diameter B of the photo spacer 17a (diameter on a surface thereof on the back surface side) was 10 µm. The pitches Px and Py of the photo spacer 17a were 20 µm and 60 µm, respectively. The shortest distance Q between the photo spacer 17a and the pixel region PR was 6.3 µm.

Example 2

A liquid crystal display panel was produced in the same manner as in Example 1 except that the second λ/4 plate 7, the first alignment film 8, and the second alignment film 10 are changed as described below.
(Second λ/4 Plate 7)

A λ/4 plate produced by the following method was used. First, a self-assembling photo alignment material was applied to the surface of the first substrate 6a on the back surface side to form a photo alignment material film. The self-assembling photo alignment material contained N-methyl-2-pyrrolidone and butyl cellosolve as solvents in addition to a solid content (alignment material F in Table 1). Then, the photo alignment material film was pre-baked at 60° C. for 90 seconds. Subsequently, the pre-baked photo alignment material film was irradiated with polarized ultraviolet (irradiation amount: 100 mJ) having a wavelength of 365 nm. The polarization axis of the polarized ultraviolet was set to be orthogonal to a slow axis to be developed for the second λ/4 plate 7. Lastly, the photo alignment material film subjected to the polarized ultraviolet irradiation was post-baked at 140° C. for 20 minutes. As a result, the second λ/4 plate 7 was obtained. The second λ/4 plate 7 was designed so that the in-plane retardation is 137.5 nm when the thickness thereof is 1.50 μm. The azimuth of the slow axis was −45°.
(First Alignment Film 8)

An alignment film produced by the following method was used. First, a self-assembling photo alignment material was applied to the surface of the second λ/4 plate 7 on the back surface side to form a photo alignment material film. The self-assembling photo alignment material contained, as a solvent in addition to a solid content (alignment material F in Table 1), a composite prepared by mixing propylene glycol monomethyl ether (PGME) and cyclohexanone (CHN) at a ratio of 6:4. Then, the photo alignment material film was pre-baked at 60° C. for 90 seconds. Subsequently, the pre-baked photo alignment material film was irradiated with polarized ultraviolet (irradiation amount: 100 mJ) having a wavelength of 365 nm. The polarization axis of the polarized ultraviolet was set to be orthogonal to the alignment direction of the liquid crystal molecules in the liquid crystal layer 9 (with no voltage application). Lastly, the photo alignment material film subjected to the polarized ultraviolet irradiation was post-baked at 140° C. for 20 minutes. As a result, the first alignment film 8 was obtained. The thickness was 100 nm.
(Second Alignment Film 10)

An alignment film produced by the following method was used. First, a self-assembling photo alignment material was applied to the surface of the second substrate 11 on the observation surface side (surface on the photo spacer 17a side) to form a photo alignment material film. The self-assembling photo alignment material contained, as a solvent in addition to a solid content (alignment material F in Table 1), a composite prepared by mixing propylene glycol monomethyl ether (PGME) and cyclohexanone (CHN) at a ratio of 6:4. Then, the photo alignment material film was pre-baked at 60° C. for 90 seconds. Subsequently, the pre-baked photo alignment material film was irradiated with polarized ultraviolet (irradiation amount: 100 mJ) having a wavelength of 365 nm. The polarization axis of the polarized ultraviolet was set to be orthogonal to the alignment direction of the liquid crystal molecules in the liquid crystal layer 9 (with no voltage application). Lastly, the photo alignment material film subjected to the polarized ultraviolet irradiation was post-baked at 140° C. for 20 minutes. As a result, the second alignment film 10 was obtained. The thickness was 100 nm.

Example 3

A liquid crystal display panel according to Embodiment 2 was produced. Components of a liquid crystal display panel according to Example 3 were as follows.
(First Polarizing Plate 4)

A polarizer (absorptive polarizing plate) obtained by stretching and aligning a polyvinyl alcohol film that an iodine complex (or a dye) dyes and adsorbs on was used. The azimuth of the transmission axis was 90°.
(First λ/4 Plate 5)

A λ/4 plate produced by the following method was used. First, a photolytic type alignment film for the first λ/4 plate 5 and a liquid crystalline photopolymerizable material were sequentially applied to a surface of a polyethylene terephthalate (PET) film to form a multilayer film. Then, the multilayer film was baked at 65° C. for 1 minute and then irradiated with ultraviolet (irradiation amount: 500 mJ). As a result, the first λ/4 plate 5 was obtained. The thickness thereof was 1.50 μm. The in-plane retardation thereof was 137.5 nm. The azimuth of the slow axis thereof was 45°. In the present example, the first λ/4 plate 5 was bonded to the surface of the first substrate 6b (first support substrate 13) on the observation surface side through a bonding agent.
(First Substrate 6b)

A color filter substrate as illustrated in FIG. 2 was used. The first support substrate 13 was a glass substrate having a thickness of 0.7 mm. The black matrix 14 was made of a black resist (light shielding ratio: 99.9%). The color filter layers 15R, 15G, and 15B were made of a pigment dispersion type color resist. The overcoat layer 16 was made of a transparent resin. The photo spacer 17b was made of a resist. The height of the photo spacer 17b was 1.7 μm.
(Second λ/4 Plate 7)

A λ/4 plate produced by the following method was used. First, a photolytic type alignment film for the second λ/4 plate 7, and a liquid crystalline photopolymerizable material were sequentially applied to a surface of the first substrate 6b on the back surface side (surface thereof on the photo spacer 17b side) to form a multilayer film. Then, the multilayer film was baked at 65° C. for 1 minute and then irradiated with ultraviolet (irradiation amount: 500 mJ). As a result, the second λ/4 plate 7 was obtained. The second λ/4 plate 7 was designed so that the in-plane retardation is 137.5 nm when the thickness thereof is 1.50 μm. The azimuth of the slow axis was −45°.
(First Alignment Film 8)

An alignment film produced by the following method was used. First, a polyimide alignment material was applied to a surface of the second λ/4 plate 7 on the back surface side to form an alignment material film. Then, the alignment material film was pre-baked at 90° C. for 2 minutes and then post-baked at 220° C. for 40 minutes. As a result, the first alignment film 8 was obtained. The thickness was 100 nm. The first alignment film 8 was subjected to rubbing treatment to define the alignment direction of liquid crystal molecules in the liquid crystal layer 9.
(Liquid Crystal Layer 9)

A Liquid crystal layer made of a negative type liquid crystal material having negative anisotropy of dielectric constant (Δε=−4.0) was used. The refractive index anisotropy (Δn) thereof was 0.095. The thickness thereof was 3.3 μm. The retardation thereof was 300 nm. The alignment direction of the liquid crystal molecules in the liquid crystal layer 9 (with no voltage application) was 0°.

(Second Alignment Film 10)

An alignment film produced by the following method was used. First, a polyimide alignment material was applied to a surface of the second substrate 11 on the observation surface side (photo spacer 17a side) to form an alignment material film. Then, the alignment material film was pre-baked at 90° C. for 2 minutes and then post-baked at 220° C. for 40 minutes. As a result, the second alignment film 10 was obtained. The thickness was 100 nm. The second alignment film 10 was subjected to rubbing treatment to define the alignment direction of the liquid crystal molecules in the liquid crystal layer 9.

(Second Substrate 11)

An FFS mode thin-film transistor array substrate as illustrated in FIG. 2 was used. The second support substrate 21 was a glass substrate having a thickness of 0.7 mm. The common electrode 20 was made of indium zinc oxide (IZO). The insulating film 19 was made of silicon nitride (SiN). The thickness of the insulating film 19 was 300 nm. The pixel electrode 18 was made of indium zinc oxide (IZO). The photo spacer 17a was made of a resist. The height of the photo spacer 17a was 3.1 μm.

(Second Polarizing Plate 12)

A polarizer (absorptive polarizing plate) obtained by stretching and aligning a polyvinyl alcohol film that an iodine complex (or a dye) dyes and adsorbs on was used. The azimuth of the transmission axis was 0°.

The liquid crystal display panel according to Example 3 had the same pixel structure as that of Example 1 (FIG. 3). In the present example, the width L of the pixel electrode 18 was 2.5 μm. The width S of the slit (the interval of the pixel electrode 18) was 3.0 μm. The tilt angle A of the pixel electrode 18 was 10°. The width W of the black matrix 14 was 20 μm. The diameter B of the photo spacer 17a (diameter on a surface thereof on the back surface side) was 10 μm. The diameter of the photo spacer 17b (diameter on a surface thereof on the observation surface side) was also 10 μm. The pitches Px and Py of the photo spacer 17a (photo spacer 17b) were 20 μm and 60 μm, respectively. The shortest distance Q between the photo spacer 17a (photo spacer 17b) and the pixel region PR was 6.3 μm.

Example 4

A liquid crystal display panel was produced in the same manner as in Example 3 except that the height of the photo spacer 17b was changed to 3.5 μm and the height of the photo spacer 17a was changed to 1.3 μm.

Comparative Example 1

Figure 4:
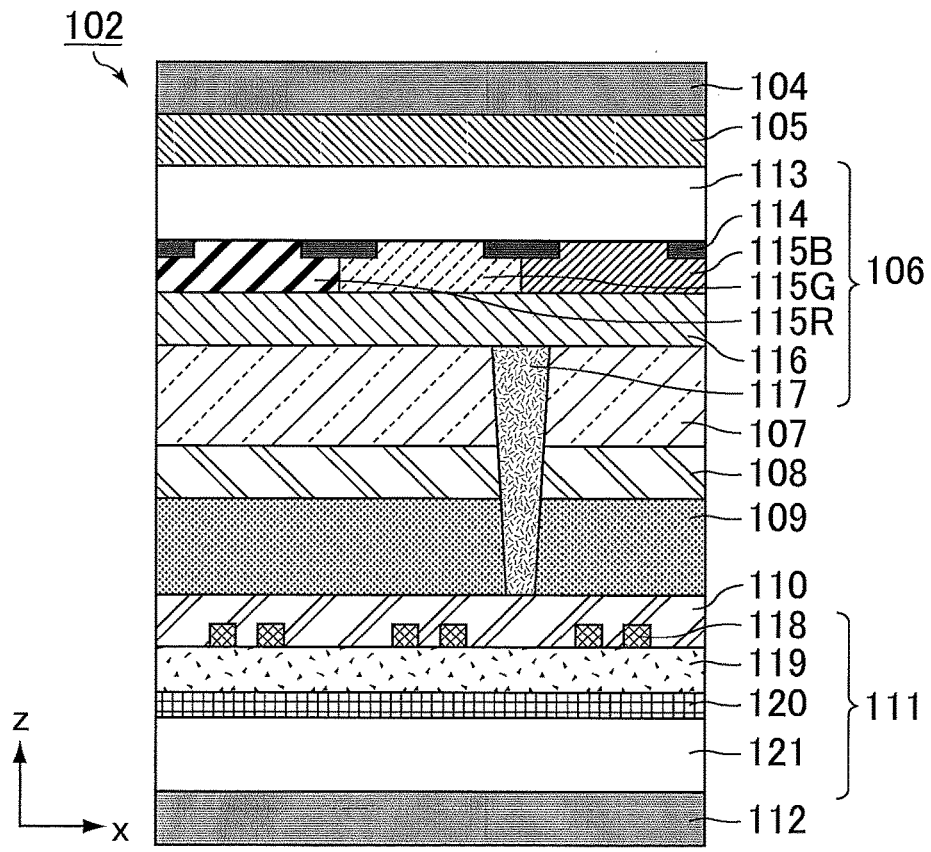
FIG. 4 is a schematic cross-sectional view illustrating a liquid crystal display panel according to Comparative Example 1.

FIG. 4 is a schematic cross-sectional view illustrating a liquid crystal display panel according to Comparative Example 1. As illustrated in FIG. 4, a liquid crystal display panel 102 includes, sequentially from an observation surface side toward a back surface side, a first polarizing plate 104, a first λ/4 plate 105, a first substrate 106, a second λ/4 plate 107, a first alignment film 108, a liquid crystal layer 109, a second alignment film 110, a second substrate 111, and a second polarizing plate 112.

The first substrate 106 includes a first support substrate 113, a black matrix 114 disposed on a surface of the first support substrate 113 on the back surface side, color filter layers 115R (red), 115G (green), and 115B (blue) covering the black matrix 114, an overcoat layer 116 covering the color filter layers 115R, 115G, 115B, and a photo spacer 117 disposed on a surface of the overcoat layer 116 on the back surface side. The photo spacer 117 overlaps with the black matrix 114. The second λ/4 plate 107 covers a side surface of the photo spacer 117.

The second substrate 111 includes a second support substrate 121, a common electrode 120 disposed on a surface of the second support substrate 121 on the observation surface side, an insulating film 119 covering the common electrode 120, and a pixel electrode (signal electrode) 118 disposed on a surface of the insulating film 119 on the observation surface side.

Components of the liquid crystal display panel according to Comparative Example 1 were as follows.

(First Polarizing Plate 104)

A polarizer (absorptive polarizing plate) obtained by stretching and aligning a polyvinyl alcohol film that an iodine complex (or a dye) dyes and adsorbs on was used. The azimuth of the transmission axis was 90°.

(First λ/4 Plate 105)

A λ/4 plate produced by the following method was used. First, a photolytic type alignment film for the first λ/4 plate 105, and a liquid crystalline photopolymerizable material were sequentially applied to a surface of a polyethylene terephthalate (PET) film to form a multilayer film. Then, the multilayer film was baked at 65° C. for 1 minute and then irradiated with ultraviolet (irradiation amount: 500 mJ). As a result, the first λ/4 plate 105 was obtained. The thickness thereof was 1.50 μm. The in-plane retardation thereof was 137.5 nm. The azimuth of the slow axis thereof was 45°. In the present comparative example, the first λ/4 plate 105 was bonded to a surface of the first substrate 106 (first support substrate 113) on the observation surface side through a bonding agent.

(First Substrate 106)

A color filter substrate as illustrated in FIG. 4 was used. The first support substrate 113 was a glass substrate having a thickness of 0.7 mm. The black matrix 114 was made of a black resist (light shielding ratio: 99.9%). The color filter layers 115R, 115G, 115B were made of a pigment dispersion type color resist. The overcoat layer 116 was made of a transparent resin. The photo spacer 117 was made of a resist. The height of the photo spacer 117 was 4.8 μm.

(Second λ/4 Plate 107)

A λ/4 plate produced by the following method was used. First, a photolytic type alignment film for the second λ/4 plate 107, and a liquid crystalline photopolymerizable material were sequentially applied to a surface of the first substrate 106 on the back surface side (surface thereof on the photo spacer 117 side) to form a multilayer film. Then, the multilayer film was baked at 65° C. for 1 minute and then irradiated with ultraviolet (irradiation amount: 500 mJ). As a result, the second λ/4 plate 107 was obtained. The second λ/4 plate 107 was designed so that the in-plane retardation is 137.5 nm when the thickness thereof is 1.50 μm. The azimuth of the slow axis was −45°.

Figure 5:
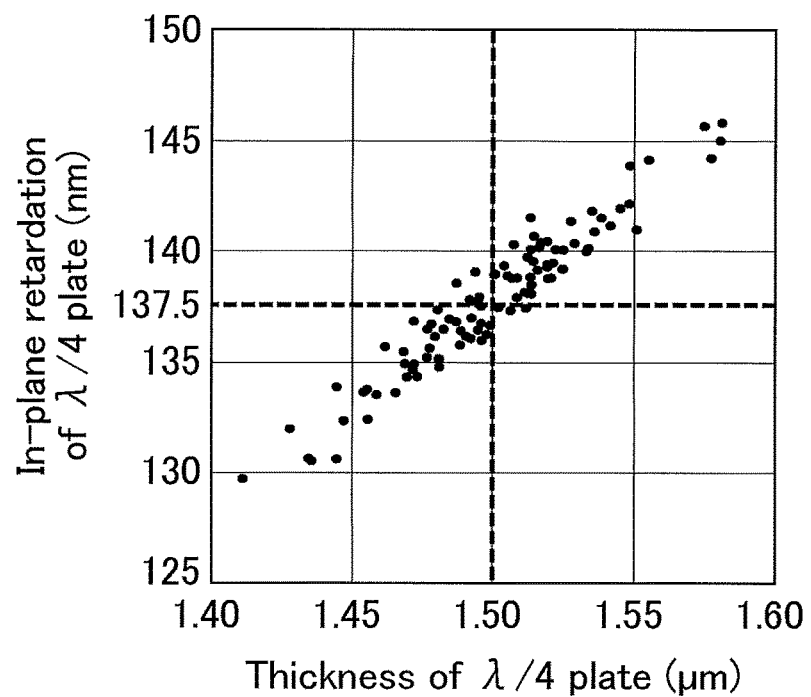
FIG. 5 is a graph illustrating the relation between the in-plane retardation and thickness of a λ/4 plate made of a liquid crystalline photopolymerizable material.

The relation between the in-plane retardation and thickness of the second λ/4 plate 107 was studied. Specifically, first, the liquid crystalline photopolymerizable material used to form the second λ/4 plate 107 was applied to 100 glass substrates to have thicknesses different from each other in the range of 1.40 to 1.60 μm. Thereafter, similarly to the above-described method, the baking and the light irradiation (ultraviolet irradiation) were sequentially performed to produce 100 samples (λ/4 plates) having thicknesses different from each other. Then, the in-plane retardation of each sample was measured. FIG. 5 illustrates results of the measurement. FIG. 5 is a graph illustrating the relation between the in-plane retardation and thickness of a λ/4 plate made of the liquid crystalline photopolymerizable material. As illustrated in FIG. 5, the in-plane retardation of the λ/4 plate was substantially proportional to the thickness. This is because, unlike a self-assembling photo alignment material, the liquid crystalline photopolymerizable material does not have refractive index anisotropy determined mainly in accordance with the baking and light irradiation processes but is a liquid crystal material having unique refractive index anisotropy. In other words, the in-plane retardation of the second λ/4 plate 107 made of the liquid crystalline photopolymerizable material varied from the designed value (137.5 nm) in proportional to the thickness along with variance of the thickness from the designed value (1.50 μm).

Figure 6:
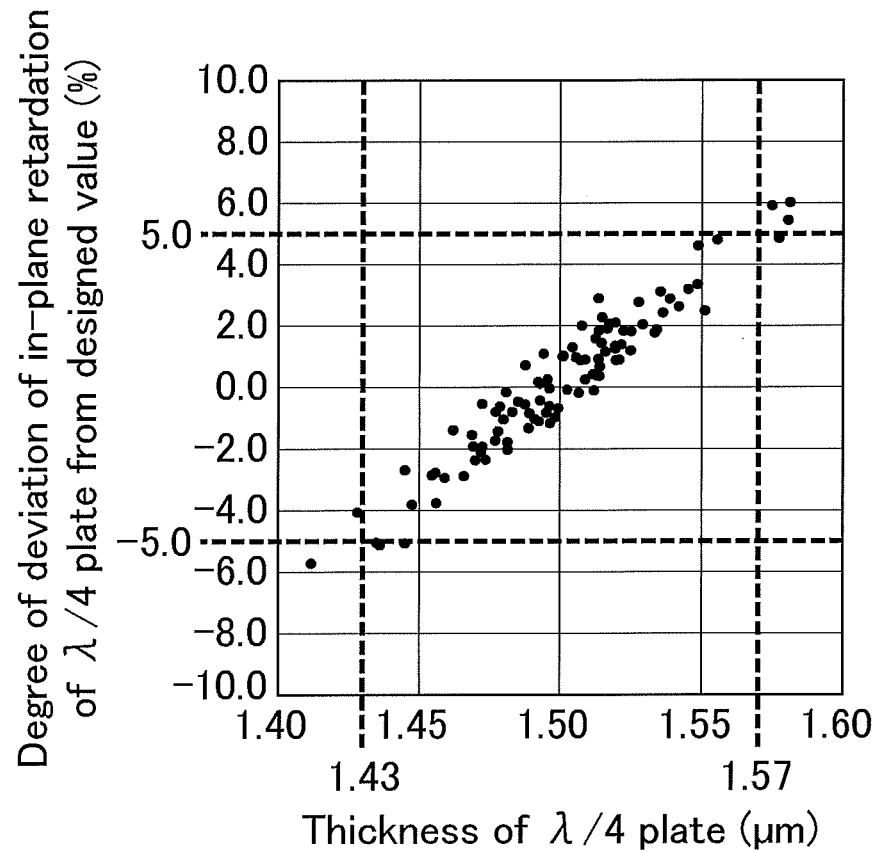
FIG. 6 is a graph derived from FIG. 5 and illustrating the relation between the degree of deviation of the in-plane retardation of the λ/4 plate from a designed value and the thickness thereof.

Subsequently, the degree of deviation of the in-plane retardation of each sample from the designed value (137.5 nm) was calculated from the evaluation result illustrated in FIG. 5. FIG. 6 illustrates results of the calculation. FIG. 6 is a graph derived from FIG. 5 and illustrating the relation between the degree of deviation of the in-plane retardation of the λ/4 plate from the designed value and the thickness thereof. The degree of deviation of the in-plane retardation of the λ/4 plate from the designed value was defined to be 100×(Rt−137.5)/137.5 (unit: %) where Rt (unit:nm) represents the in-plane retardation at a certain thickness. As illustrated in FIG. 6, the degree of deviation of the in-plane retardation of the λ/4 plate from the designed value was out of the range of ±5.0% in some cases when the thickness varied in the range of the designed value (1.50 μm)±0.10 μm. Specifically, the degree of deviation of the in-plane retardation of the λ/4 plate from the designed value was out of the range of ±5.0% when the thickness was out of the range of the designed value (1.50 μm)±0.07 μm. It is known that a high contrast ratio (equal to or higher than 500) liquid crystal display panel is obtained when the degree of deviation of the in-plane retardation of a λ/4 plate from a designed value is within the range of ±5.0% (within an allowable range) in the pixel region. In other words, the thickness of the second λ/4 plate 107 made of the liquid crystalline photopolymerizable material needed to be in the range of the designed value (1.50 μm)±0.07 μm so that the degree of deviation of the in-plane retardation from the designed value was in the allowable range of ±5.0%.

(First Alignment Film 108)

An alignment film produced by the following method was used. First, a polyimide alignment material was applied to a surface of the second λ/4 plate 107 on the back surface side to form an alignment material film. Then, the alignment material film was pre-baked at 90° C. for 2 minutes and then post-baked at 220° C. for 40 minutes. As a result, the first alignment film 108 was obtained. The thickness was 100 nm. The first alignment film 108 was subjected to rubbing treatment to define the alignment direction of liquid crystal molecules in the liquid crystal layer 109.

(Liquid Crystal Layer 109)

A Liquid crystal layer made of a negative type liquid crystal material having negative anisotropy of dielectric constant (Δε=−4.0) was used. The refractive index anisotropy (Δn) thereof was 0.095. The thickness thereof was 3.3 μm. The retardation thereof was 300 nm. The alignment direction of the liquid crystal molecules in the liquid crystal layer 109 (with no voltage application) was 0°.

(Second Alignment Film 110)

An alignment film produced by the following method was used. First, a polyimide alignment material was applied to a surface of the second substrate 111 on the observation surface side to form an alignment material film. Then, the alignment material film was pre-baked at 90° C. for 2 minutes and then post-baked at 220° C. for 40 minutes. As a result, the second alignment film 110 was obtained. The thickness was 100 nm. The second alignment film 110 was subjected to rubbing treatment to define the alignment direction of the liquid crystal molecules in the liquid crystal layer 109.

(Second Substrate 111)

An FFS mode thin-film transistor array substrate as illustrated in FIG. 4 was used. The second support substrate 121 was a glass substrate having a thickness of 0.7 mm. The common electrode 120 was made of indium zinc oxide (IZO). The insulating film 119 was made of silicon nitride (SiN). The thickness of the insulating film 119 was 300 nm. The pixel electrode 118 was made of indium zinc oxide (IZO).

(Second Polarizing Plate 112)

A polarizer (absorptive polarizing plate) obtained by stretching and aligning a polyvinyl alcohol film that an iodine complex (or a dye) dyes and adsorbs on was used. The azimuth of the transmission axis was 0°.

Figure 7:
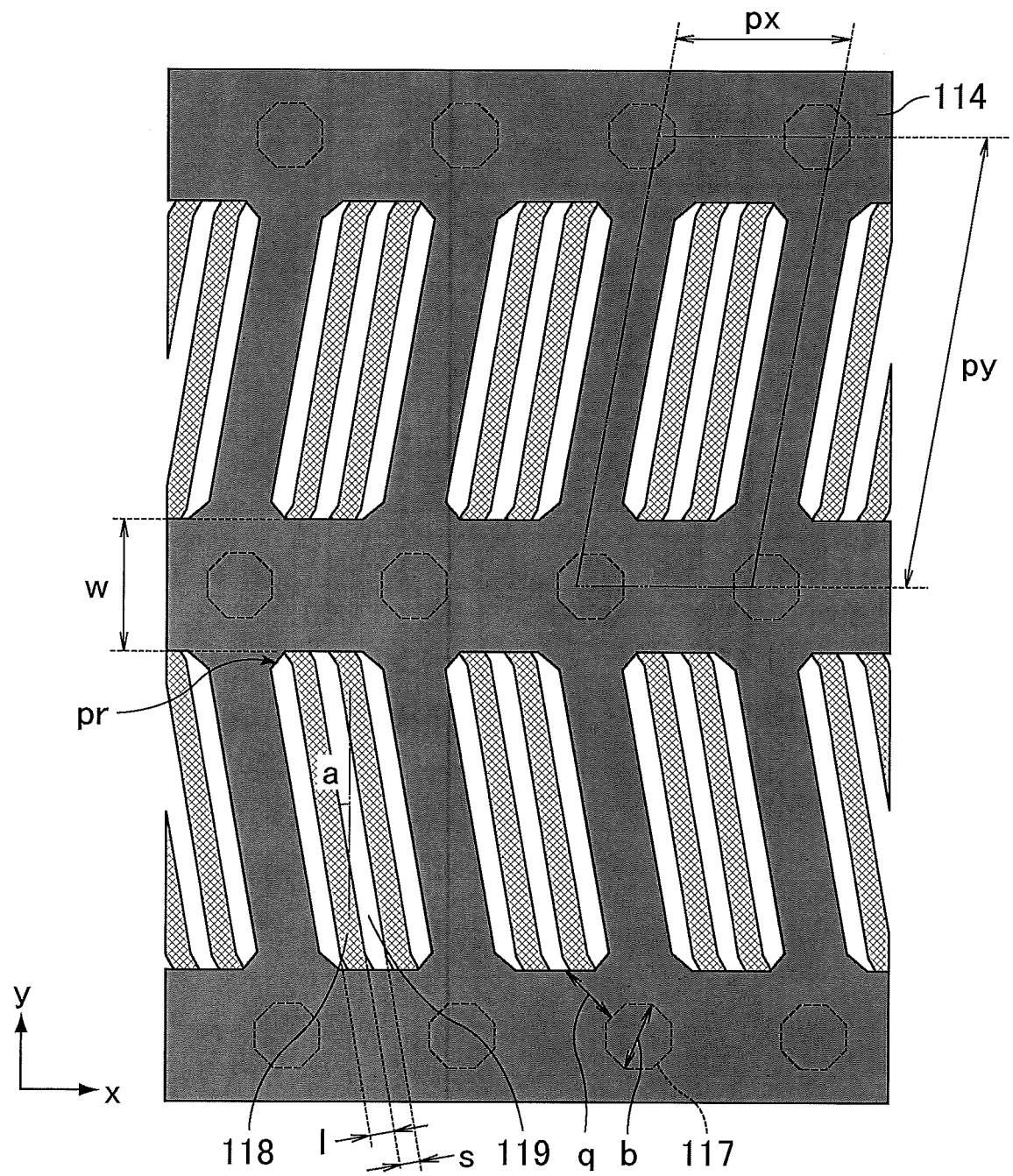
FIG. 7 is a schematic plan view illustrating a pixel structure of the liquid crystal display panel according to Comparative Example 1.

The following describes a pixel structure of the liquid crystal display panel according to Comparative Example 1 with reference to FIG. 7. FIG. 7 is a schematic plan view illustrating the pixel structure of the liquid crystal display panel according to Comparative Example 1. FIG. 7 illustrates a diagram focused on the black matrix 114, the photo spacer 117, and the pixel electrode 118 when the liquid crystal display panel in FIG. 4 is viewed from the observation surface side. As illustrated in FIG. 7, a plurality of regions (openings) partitioned by the black matrix 114 each correspond to a pixel region pr. The pixel electrode 18 (width: l) provided with a slit (width: s) is disposed in the pixel region pr. In the present comparative example, the width l of the pixel electrode 118 was 2.5 μm. The width s of the slit (interval of the pixel electrode 118) was 3.0 μm.

The long axis of each liquid crystal molecule in the liquid crystal layer 109 is tilted by a (the tilt angle of the pixel electrode 118) relative to the y direction in FIG. 7 upon voltage application. In the present comparative example, the tilt angle a of the pixel electrode 118 was 10°. Each liquid crystal molecule in the liquid crystal layer 109 was aligned so that the long axis was along the x direction in FIG. 7 (0°) with no voltage application.

The photo spacer 117 (diameter: b) was disposed at pitches px and py to be hidden by the black matrix 114 (width: w) and was disposed so that the shortest distance to the pixel region pr (shortest distance between an end part of the photo spacer 117 and an end part of the pixel region pr) was q. In the present comparative example, the width w of the black matrix 114 was 20 μm. The diameter b of the photo spacer 117 (diameter on a surface thereof on the observation surface side) was 10 μm. The pitches px and py of the photo spacer 117 were 20 μm and 60 μm, respectively. The shortest distance q between the photo spacer 117 and the pixel region pr was 6.3 μm.

[Evaluation 1]

The thickness of the second λ/4 plate 7 was studied for Example 1. As a result, the thickness of the second λ/4 plate 7 was in the range of the designed value (1.50 μm)±0.07 μm in the pixel region PR. Accordingly, the degree of deviation of the in-plane retardation of the second λ/4 plate 7 from the designed value was sufficiently in the allowable range of ±5.0% in the pixel region PR. No light leakage was found in observation of the liquid crystal display panel according to Example 1 (with no voltage application) with a polarization microscope. Thus, according to Example 1, the luminance of the black display state in the pixel region PR was reduced, and thereby a higher contrast ratio liquid crystal display panel was achieved. The contrast ratio of the liquid crystal display panel according to Example 1 was measured to be 600 in a darkroom (environment in which the illuminance is 0.1 1x or lower).

[Evaluation 2]

The thickness of the second λ/4 plate 7 was studied for Example 2, and a result similar to that of Example 1 was obtained. As a result of observation of the liquid crystal display panel according to Example 2 (with no voltage application) with a polarization microscope, no light leakage was found and the liquid crystal display panel was darker than the liquid crystal display panel according to Example 1 (with no voltage application). Thus, according to Example 2, the luminance of the black display state in the pixel region PR was reduced as compared to that in Example 1, and thereby a high contrast ratio liquid crystal display panel was achieved. The contrast ratio of the liquid crystal display panel according to Example 2 was measured to be 750 in a darkroom (environment in which the illuminance is 0.1 lx or lower).

[Evaluation 3]

Figure 8:
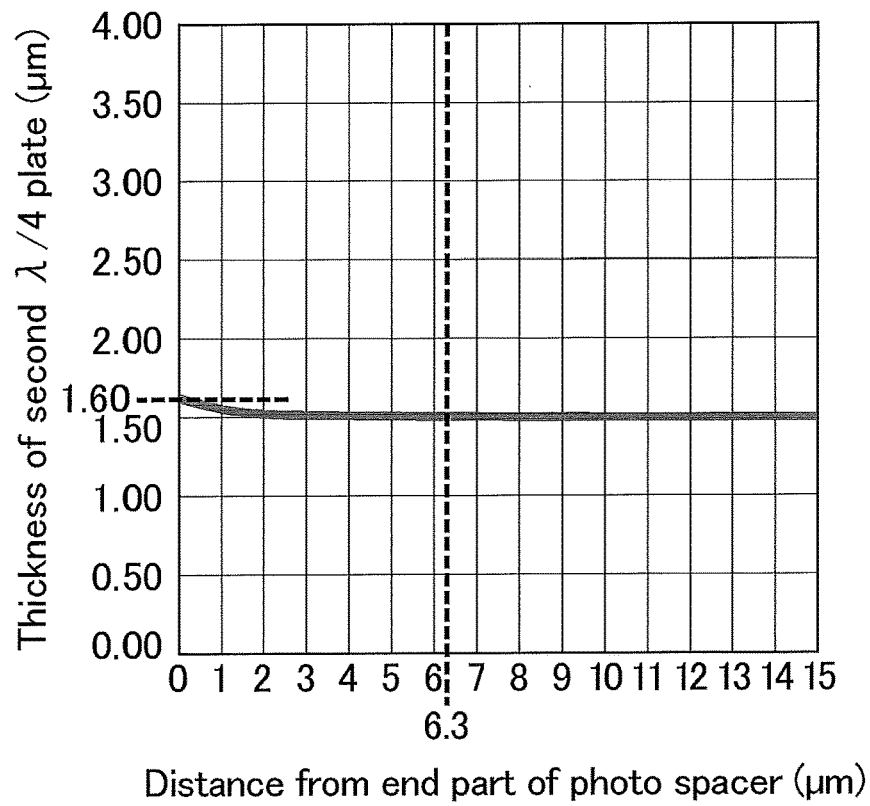
FIG. 8 is a graph illustrating the relation between the thickness of a second λ/4 plate and the distance from an end part of a photo spacer in Example 3.
Figure 9:
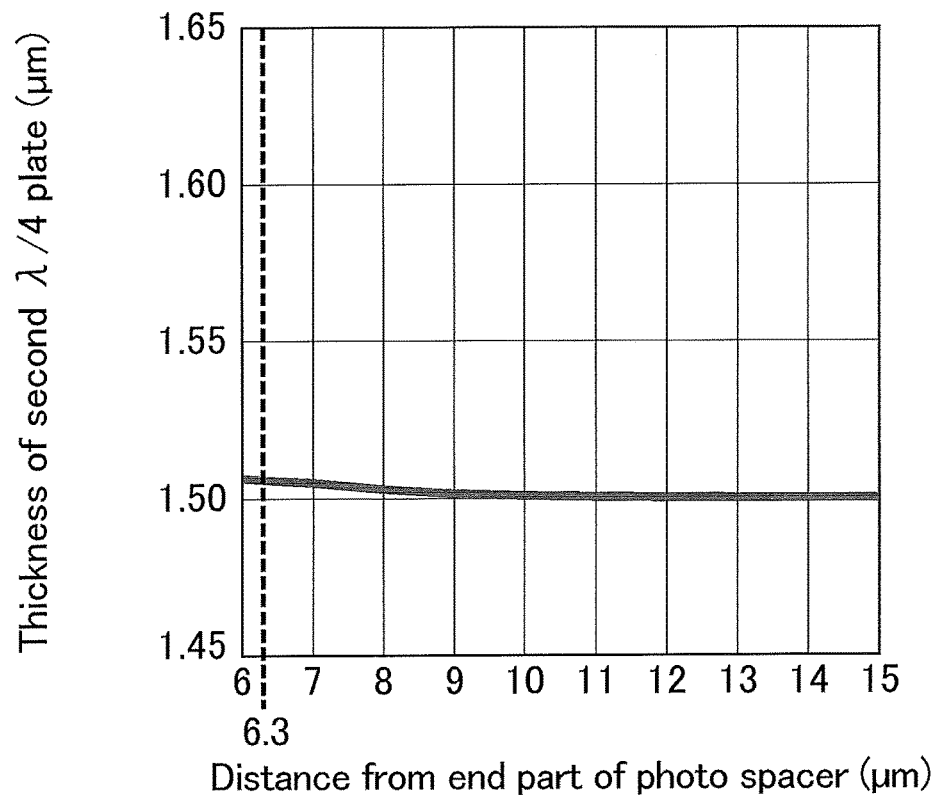
FIG. 9 is an enlarged graph of a region in which the horizontal axis in FIG. 8 is 6 to 15 μm.

The relation between the distance from the end part of the photo spacer 17b and the thickness of the second λ/4 plate 7 at the distance was studied for Example 3. FIG. 8 is a graph illustrating the relation between the thickness of the second λ/4 plate and the distance from the end part of the photo spacer in Example 3. FIG. 9 is an enlarged graph of a region in which the horizontal axis in FIG. 8 is 6 to 15 μm. As illustrated in FIG. 8, the thickness of the second λ/4 plate 7 becomes larger than the designed value (1.50 μm) at a position closer to the photo spacer 17b and equal to 1.60 μm at the end part of the photo spacer 17b (the horizontal axis: 0 μm), which is larger than the designed value (1.50 μm) in the pixel region PR by 0.1 μm. In Example 3, since the shortest distance Q between the photo spacer 17b and the pixel region PR was 6.3 μm as described above, a region in which the thickness of the second λ/4 plate 7 is larger than the designed value (1.50 μm) was almost entirely covered by the black matrix 14. As illustrated in FIG. 9, the thickness of the second λ/4 plate 7 was in the range of the designed value (1.50 μm)±0.07 μm in a region (including the pixel region PR) in which the distance from the end part of the photo spacer 17b is 6.3 μm or larger.

Figure 10:
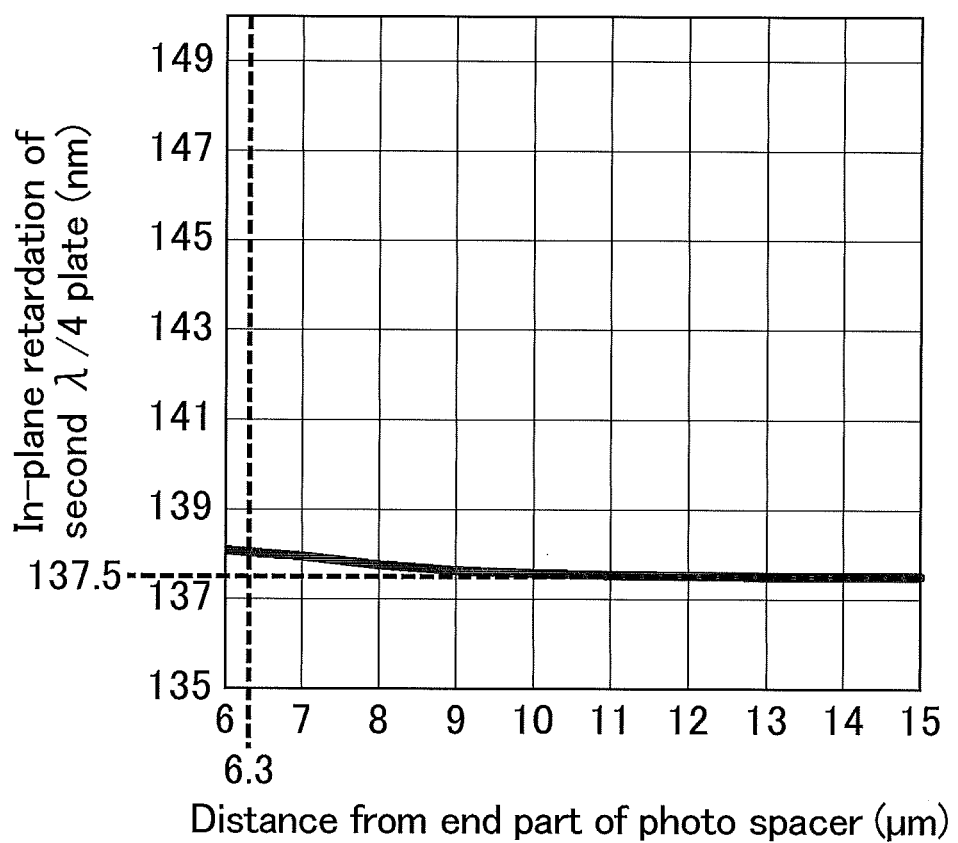
FIG. 10 is a graph illustrating the relation between the in-plane retardation of the second λ/4 plate and the distance from the end part of the photo spacer in Example 3.

Subsequently, the relation between the distance from the end part of the photo spacer 17b and the in-plane retardation of the second λ/4 plate 7 at the distance was studied for Example 3. FIG. 10 is a graph illustrating the relation between the in-plane retardation of the second λ/4 plate and the distance from the end part of the photo spacer in Example 3. As illustrated in FIG. 10, the in-plane retardation of the second λ/4 plate 7 slowly increases in a region (including the pixel region PR) in which the distance from the end part of the photo spacer 17b is 6.3 μm or larger. This is because the height of the photo spacer 17b was reduced.

Figure 11:
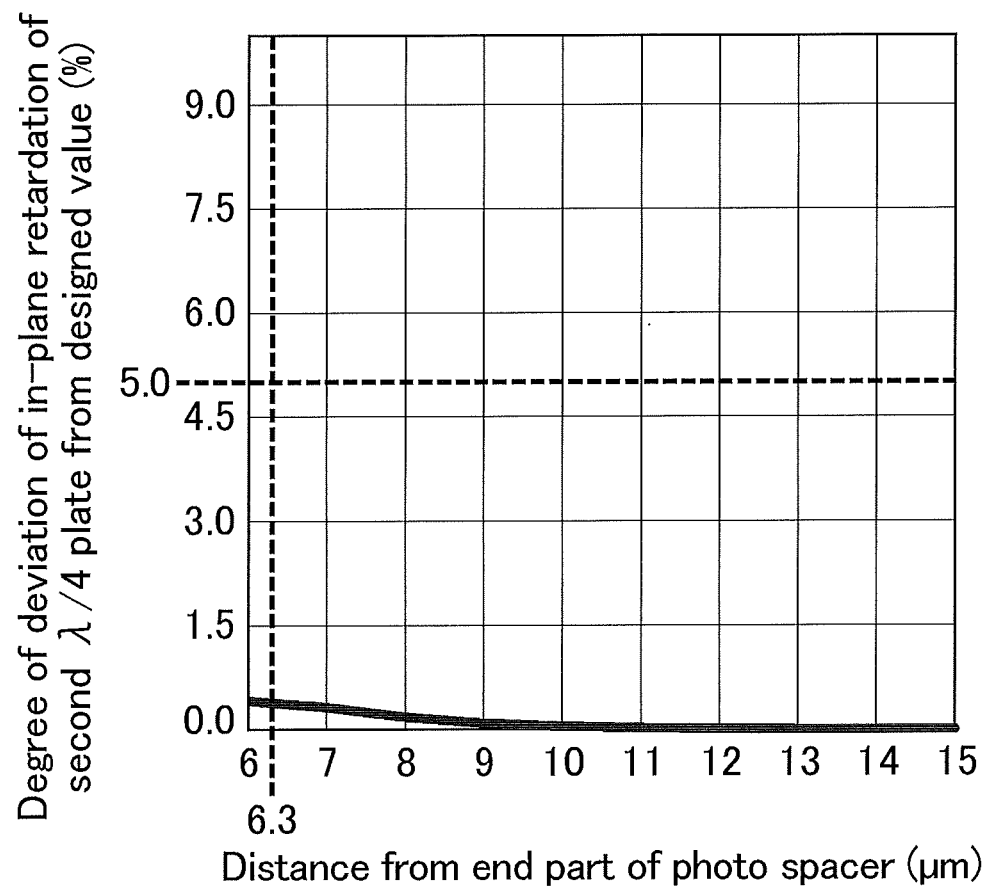
FIG. 11 is a graph derived from FIG. 10 and illustrating the relation between the degree of deviation of the in-plane retardation of the second λ/4 plate from the designed value and the distance from the end part of the photo spacer.

In addition, the degree of deviation of the in-plane retardation of the second λ/4 plate 7 from the designed value (137.5 nm) was calculated from the evaluation result illustrated in FIG. 10. FIG. 11 illustrates results of the calculation. FIG. 11 is a graph derived from FIG. 10 and illustrating the relation between the degree of deviation of the in-plane retardation of the second λ/4 plate from the designed value and the distance from the end part of the photo spacer. As illustrated in FIG. 11, the degree of deviation of the in-plane retardation of the second λ/4 plate 7 from the designed value was sufficiently in the allowable range of ±5.0% (in FIG. 11, in the range of 0 to 5.0%) in the region (including the pixel region PR) in which the distance from the end part of the photo spacer 17b is 6.3 μm or larger.

No light leakage was found in observation of the liquid crystal display panel according to Example 3 (with no voltage application) with a polarization microscope. Thus, according to Example 3, the luminance of the black display state in the pixel region PR was reduced, and thereby a higher contrast ratio liquid crystal display panel was achieved. The contrast ratio of the liquid crystal display panel according to Example 3 was measured to be 650 in a darkroom (environment in which the illuminance is 0.1 lx or lower).

[Evaluation 4]

Figure 12:
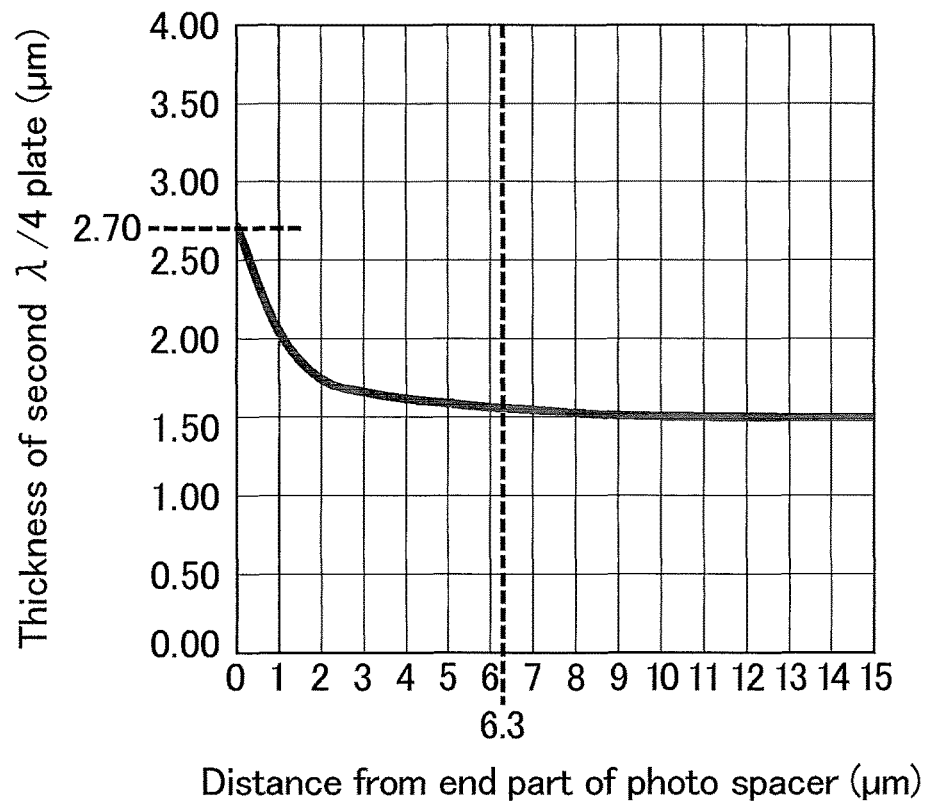
FIG. 12 is a graph illustrating the relation between the thickness of the second λ/4 plate and the distance from the end part of the photo spacer in Example 4.
Figure 13:
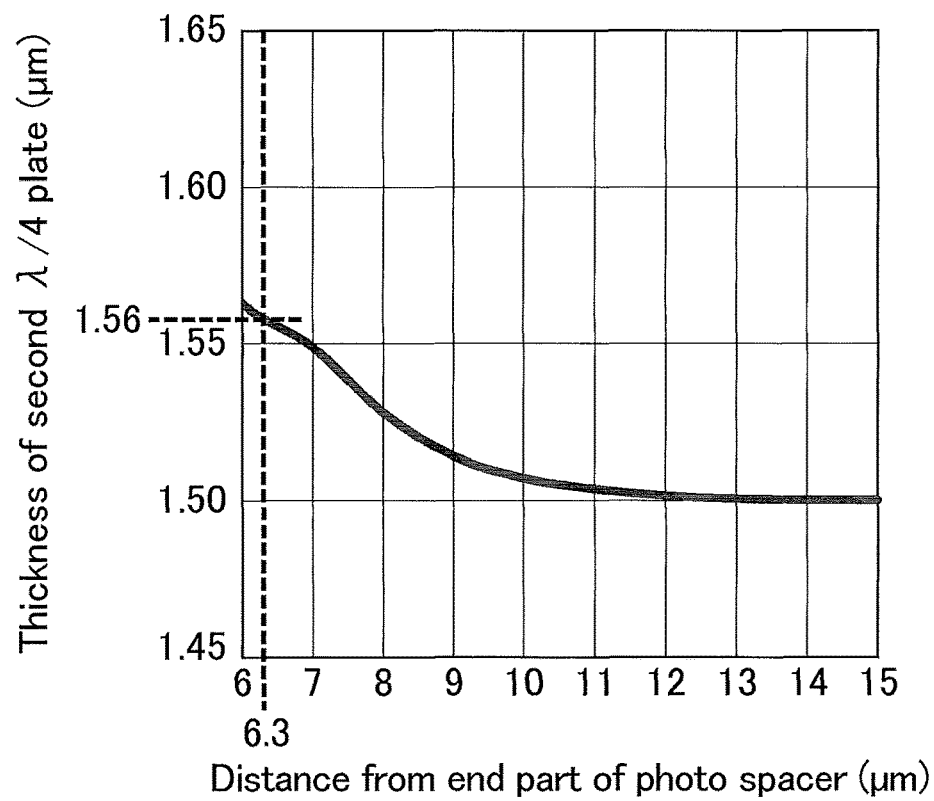
FIG. 13 is an enlarged graph of a region in which the horizontal axis in FIG. 12 is 6 to 15 μm.

The relation between the distance from the end part of the photo spacer 17b and the thickness of the second λ/4 plate 7 at the distance was studied for Example 4. FIG. 12 is a graph illustrating the relation between the thickness of the second λ/4 plate and the distance from the end part of the photo spacer in Example 4. FIG. 13 is an enlarged graph of a region in which the horizontal axis in FIG. 12 is 6 to 15 μm. As illustrated in FIG. 12, the thickness of the second λ/4 plate 7 becomes larger than the designed value (1.50 μm) at a position closer to the photo spacer 17b and is 2.70 μm at the end part of the photo spacer 17b (the horizontal axis: 0 μm). In Example 4, since the shortest distance Q between the photo spacer 17b and the pixel region PR was 6.3 μm as described above, a region in which the thickness of the second λ/4 plate 7 is larger than the designed value (1.50 μm) was almost entirely covered by the black matrix 14. As illustrated in FIG. 13, the thickness of the second λ/4 plate 7 was 1.56 μm at a position separated by 6.3 μm from the end part of the photo spacer 17b, in other words, at the end part of the pixel region PR. In other words, the thickness of the second λ/4 plate 7 was in the range of the designed value (1.50 μm)±0.07 μm in a region (including the pixel region PR) in which the distance from the end part of the photo spacer 17b is 6.3 μm or larger.

Figure 14:
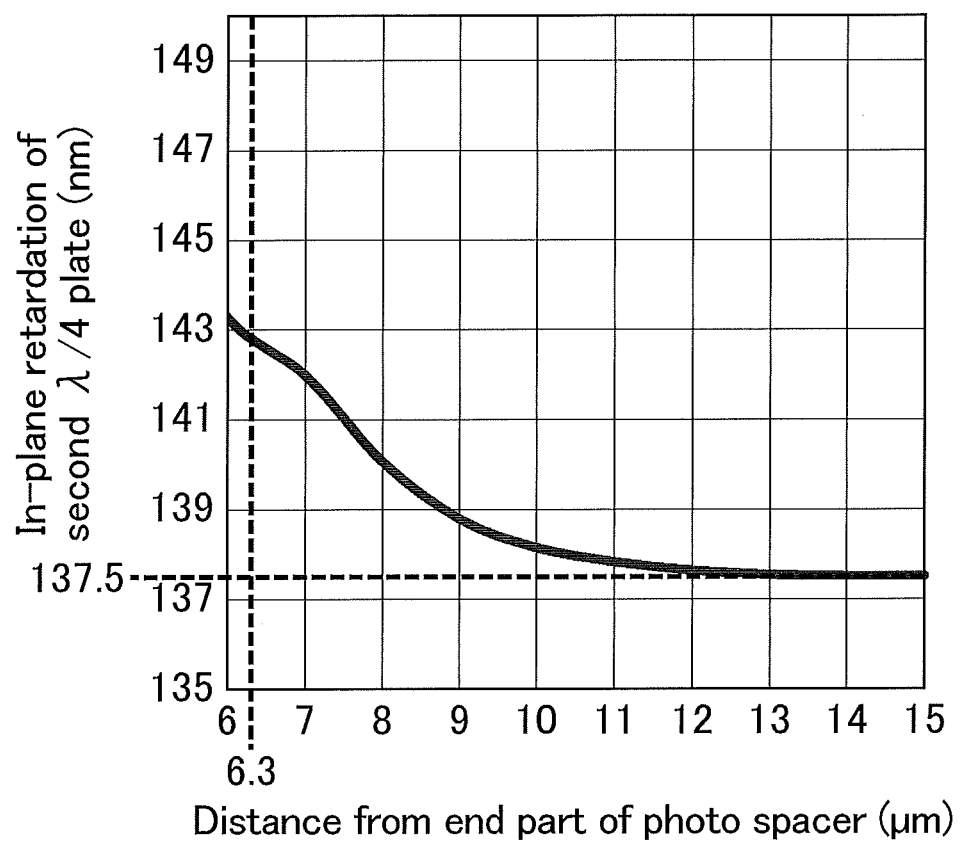
FIG. 14 is a graph illustrating the relation between the in-plane retardation of the second λ/4 plate and the distance from the end part of the photo spacer in Example 4.

Subsequently, the relation between the distance from the end part of the photo spacer 17b and the in-plane retardation of the second λ/4 plate 7 at the distance was studied for Example 4. FIG. 14 is a graph illustrating the relation between the in-plane retardation of the second λ/4 plate and the distance from the end part of the photo spacer in Example 4. As illustrated in FIG. 14, the in-plane retardation of the second λ/4 plate 7 slowly increases in a region (including the pixel region PR) in which the distance from the end part of the photo spacer 17b is 6.3 μm or larger. This is because the height of the photo spacer 17b was reduced.

Figure 15:
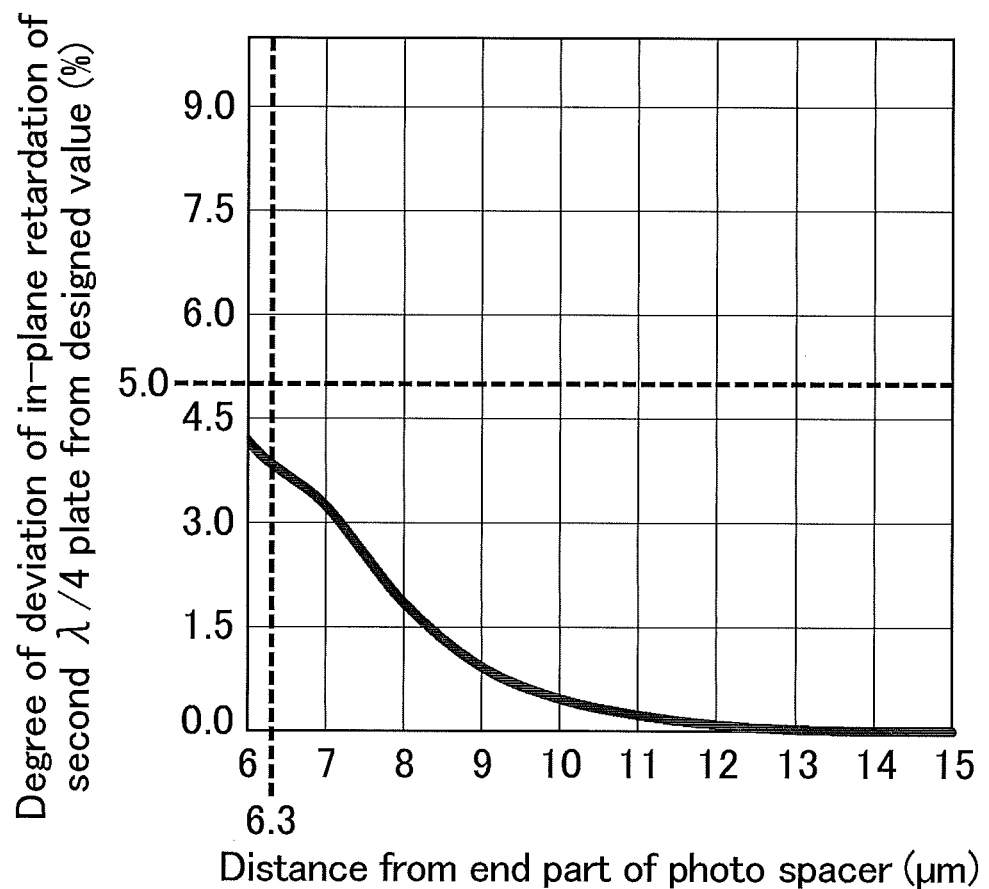
FIG. 15 is a graph derived from FIG. 14 and illustrating the relation between the degree of deviation of the in-plane retardation of the second λ/4 plate from the designed value and the distance from the end part of the photo spacer.

In addition, the degree of deviation of the in-plane retardation of the second λ/4 plate 7 from the designed value (137.5 nm) was calculated from the evaluation result illustrated in FIG. 14. FIG. 15 illustrates results of the calculation. FIG. 15 is a graph derived from FIG. 14 and illustrating the relation between the degree of deviation of the in-plane retardation of the second λ/4 plate from the designed value and the distance from the end part of the photo spacer. As illustrated in FIG. 15, the degree of deviation of the in-plane retardation of the second λ/4 plate 7 from the designed value was sufficiently in the allowable range of ±5.0% (in FIG. 15, in the range of 0 to 5.0%) in the region (including the pixel region PR) in which the distance from the end part of the photo spacer 17b is 6.3 μm or larger.

No light leakage was found in observation of the liquid crystal display panel according to Example 4 (with no voltage application) with a polarization microscope. Thus, according to Example 4, the luminance of the black display state in the pixel region PR was reduced, and thereby a higher contrast ratio liquid crystal display panel was achieved. The contrast ratio of the liquid crystal display panel according to Example 4 was measured to be 550 in a darkroom (environment in which the illuminance is 0.1 lx or lower).

[Evaluation 5]

Figure 16:
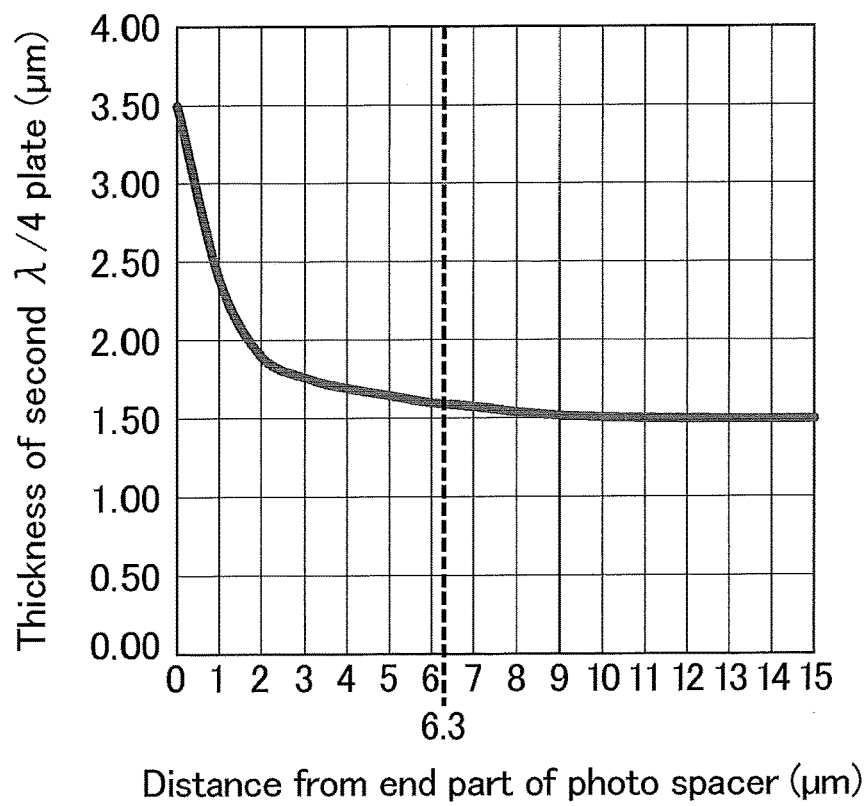
FIG. 16 is a graph illustrating the relation between the thickness of the second λ/4 plate and the distance from the end part of the photo spacer in Comparative Example 1.
Figure 17:
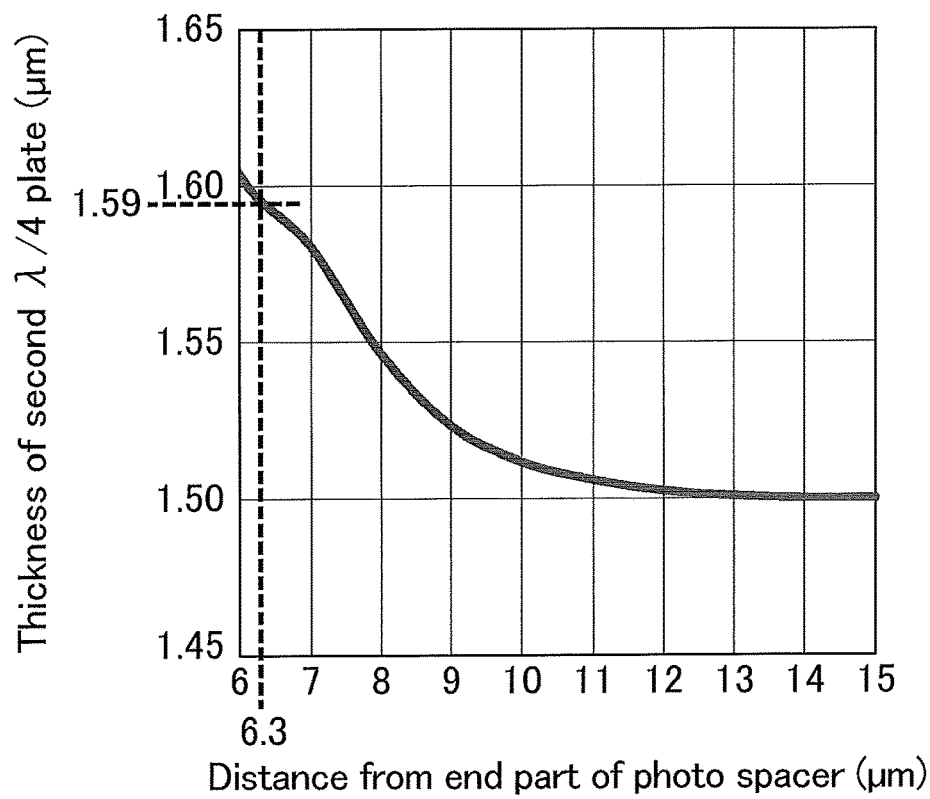
FIG. 17 is an enlarged graph of a region in which the horizontal axis in FIG. 16 is 6 to 15 μm.

The relation between the distance from the end part of the photo spacer 117 and the thickness of the second λ/4 plate 107 at the distance was studied for Comparative Example 1. FIG. 16 is a graph illustrating the relation between the thickness of the second λ/4 plate and the distance from the end part of the photo spacer in Comparative Example 1. FIG. 17 is an enlarged graph of a region in which the horizontal axis in FIG. 16 is 6 to 15 μm. As illustrated in FIG. 16, the thickness of the second λ/4 plate 107 becomes larger than the designed value (1.50 μm) at a position closer to the photo spacer 117 and equal to 3.50 μm at the end part of the photo spacer 117 (the horizontal axis: 0 μm), which is more than twice as large as the designed value (1.50 μm) in the pixel region pr. In Comparative Example 1, since the shortest distance q between the photo spacer 117 and the pixel region pr was 6.3 μm as illustrated in FIG. 7, a region in which the thickness of the second λ/4 plate 107 is larger than the designed value (1.50 μm) was almost entirely covered by the black matrix 114. As illustrated in FIG. 17, the thickness of the second λ/4 plate 107 was 1.59 μm at a position separated by 6.3 μm from the end part of the photo spacer 117, in other words, at the end part of the pixel region pr, which is larger than the designed value (1.50 μm) by 0.09 μm. According to FIG. 6, the end part of the pixel region pr is a position at which the degree of deviation of the in-plane retardation of the second λ/4 plate 107 from the designed value becomes larger than 5.0%.

Figure 18:
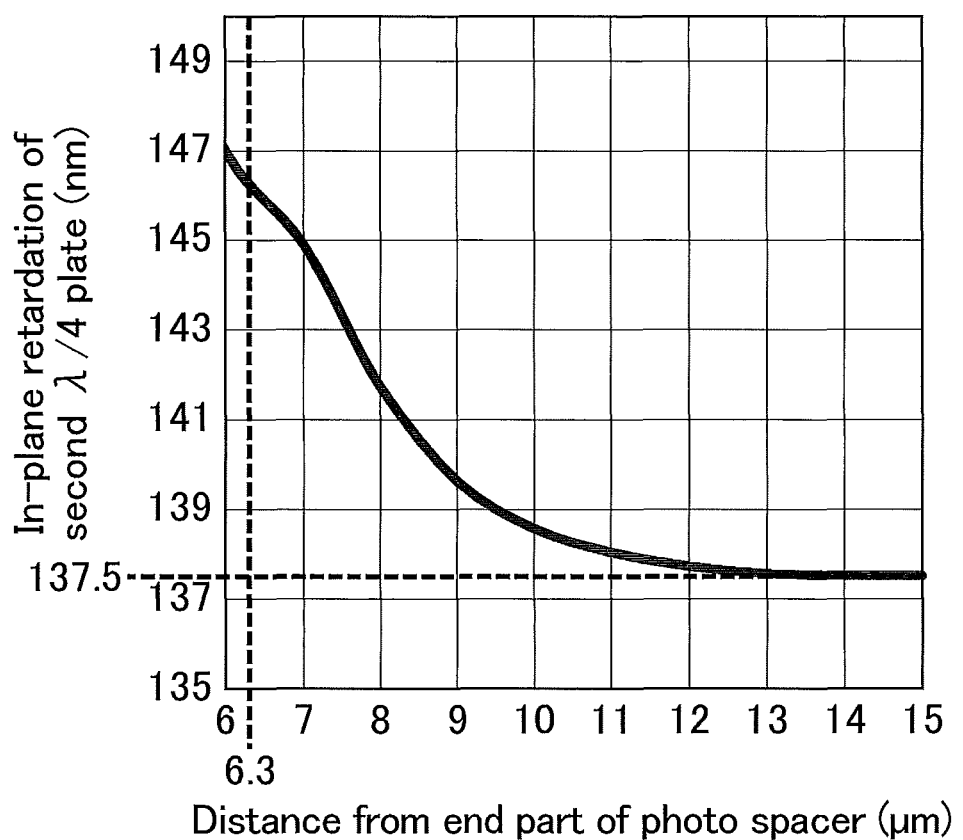
FIG. 18 is a graph illustrating the relation between the in-plane retardation of the second λ/4 plate and the distance from the end part of the photo spacer in Comparative Example 1.

Subsequently, the relation between the distance from the end part of the photo spacer 117 and the in-plane retardation of the second λ/4 plate 107 at the distance was studied for Comparative Example 1. FIG. 18 is a graph illustrating the relation between the in-plane retardation of the second λ/4 plate and the distance from the end part of the photo spacer in Comparative Example 1. As illustrated in FIG. 18, the in-plane retardation of the second λ/4 plate 107 steeply increases in a region (including the pixel region pr) in which the distance from the end part of the photo spacer 117 is 6.3 μm or larger. This is because the in-plane retardation of the second λ/4 plate 107 is substantially proportional to the thickness as described above with reference to FIG. 5.

Figure 19:
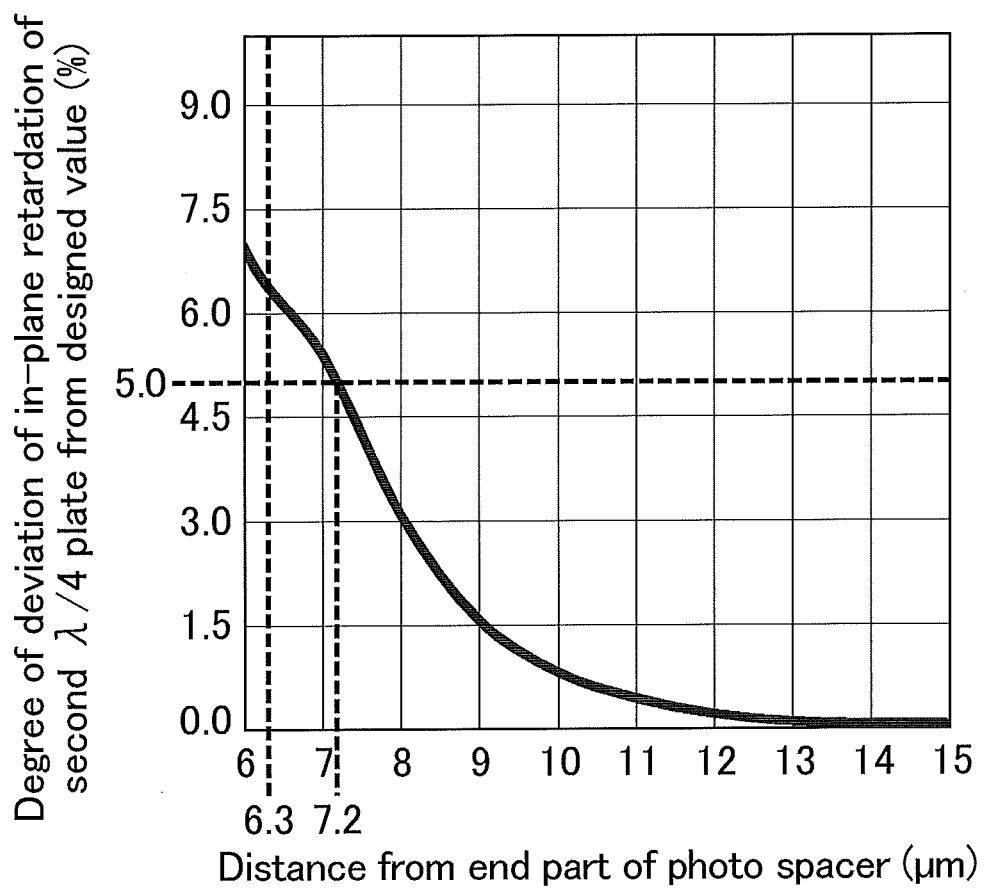
FIG. 19 is a graph derived from FIG. 18 and illustrating the relation between the degree of deviation of the in-plane retardation of the second λ/4 plate from the designed value and the distance from the end part of the photo spacer.

In addition, the degree of deviation of the in-plane retardation of the second λ/4 plate 107 from the designed value (137.5 nm) was calculated from the evaluation result illustrated in FIG. 18. FIG. 19 illustrates results of the calculation. FIG. 19 is a graph derived from FIG. 18 and illustrating the relation between the degree of deviation of the in-plane retardation of the second λ/4 plate from the designed value and the distance from the end part of the photo spacer. As illustrated in FIG. 19, the degree of deviation of the in-plane retardation of the second λ/4 plate 107 from the designed value was out of the allowable range of ±5.0% (in FIG. 19, the range of 0 to 5.0%) in part of a region (including the pixel region pr) in which the distance from the end part of the photo spacer 117 is 6.3 μm or larger. Specifically, the degree of deviation of the in-plane retardation of the second λ/4 plate 107 from the designed value was larger than 5.0% when the distance from the end part of the photo spacer 117 was smaller than 7.2 μm.

Accordingly, the in-plane retardation of the second λ/4 plate 107 largely differs between the pixel region pr and the vicinity of the photo spacer 117 when the thickness increases as the position approaches the photo spacer 117 from the pixel region pr, and light leakage in the vicinity of the photo spacer 117 cannot be reduced even when the second λ/4 plate 107 is used in combination with the black matrix 114. Light leakage in the size of several micrometers was found at a large number of places in observation of the liquid crystal display panel according to Comparative Example 1 (with no voltage application) with a polarization microscope. The contrast ratio of the liquid crystal display panel according to Comparative Example 1 was measured to be 400 in a darkroom (environment in which the illuminance is 0.1 lx or lower), which was lower than those in Examples 1 to 4.

[Additional Remarks]

One aspect of the present invention may be a liquid crystal display panel (first liquid crystal display panel according to the present invention) including, sequentially from an observation surface side toward a back surface side: a first polarizing plate; a first λ/4 plate; a first substrate; a second λ/4 plate; a liquid crystal layer; a second substrate; and a second polarizing plate. One of the first substrate and the second substrate includes a pair of electrodes configured to generate a horizontal electric field at the liquid crystal layer upon voltage application. The first substrate includes a black matrix but no photo spacer. The second substrate includes a photo spacer overlapping with the black matrix. Liquid crystal molecules in the liquid crystal layer homogeneously align with no voltage application between the electrodes. The second λ/4 plate covers no side surface of the photo spacer. The in-plane slow axis of the first λ/4 plate forms an angle of 45° with the transmission axis of the first polarizing plate and is orthogonal to the in-plane slow axis of the second λ/4 plate. According to this aspect, the following effects can be achieved.

(1) Since a circular polarizing plate in which the first polarizing plate and the first λ/4 plate are stacked is disposed on the observation surface side in the liquid crystal display panel, increased visibility at a bright place is achieved by the effect of reflection prevention by the circular polarizing plate.

(2) Since the first substrate includes no photo spacer, no variance occurs to the thickness and in-plane retardation of the second λ/4 plate, which leads to reduced light leakage in the vicinity of the photo spacer.

Another aspect of the present invention may be a liquid crystal display panel (second liquid crystal display panel according to the present invention) including, sequentially from an observation surface side toward a back surface side: a first polarizing plate; a first λ/4 plate; a first substrate; a second λ/4 plate; a liquid crystal layer; a second substrate; and a second polarizing plate. One of the first substrate and the second substrate includes a pair of electrodes configured to generate a horizontal electric field at the liquid crystal layer upon voltage application. The first substrate includes a black matrix, and a first photo spacer disposed on the back surface side of the black matrix and overlapping with the black matrix. The second substrate includes a second photo spacer overlapping with the first photo spacer. Liquid crystal molecules in the liquid crystal layer homogeneously align with no voltage application between the electrodes. The second λ/4 plate includes a flat part having a flat surface on the back surface side, and covers a side surface of the first photo spacer but not a side surface of the second photo spacer. The height of the first photo spacer is larger than the thickness of the flat part of the second λ/4 plate by 0.2 to 2.0 μm. The in-plane slow axis of the first λ/4 plate forms an angle of 45° with the transmission axis of the first polarizing plate and is orthogonal to the in-plane slow axis of the second λ/4 plate. According to this aspect, the following effects can be achieved.

(1) Since a circular polarizing plate in which the first polarizing plate and the first λ/4 plate are stacked is disposed on the observation surface side in the liquid crystal display panel, increased visibility at a bright place is achieved by the effect of reflection prevention by the circular polarizing plate.

(2) Since the height of the first photo spacer is small, variance in the thickness and in-plane retardation of the second λ/4 plate is reduced, which leads to reduced light leakage in the vicinity of the first photo spacer.

In the first liquid crystal display panel according to the present invention, and the second liquid crystal display panel according to the present invention, the second λ/4 plate may be made of a self-assembling photo alignment material containing a photo functional group capable of causing at least one chemical reaction selected from the group consisting of photodimerization, photoisomerizatioin, and photo-Fries rearrangement. With this configuration, the second λ/4 plate can be effectively used, and thereby the contrast ratio of the liquid crystal display panel (the first liquid crystal display panel according to the present invention and the second liquid crystal display panel according to the present invention) was increased.

In the first liquid crystal display panel according to the present invention, and the second liquid crystal display panel according to the present invention, the second λ/4 plate may be made of a liquid crystalline photopolymerizable material. With this configuration, the second λ/4 plate can be effectively used.

In the first liquid crystal display panel according to the present invention, and the second liquid crystal display panel according to the present invention, the transmission axis of the first polarizing plate and the transmission axis of the second polarizing plate may be orthogonal to each other. With this configuration, the first polarizing plate and the second polarizing plate are disposed in crossed Nicols, and thus a preferable black display state can be achieved with no voltage application.

In the first liquid crystal display panel according to the present invention, and the second liquid crystal display panel according to the present invention, the alignment direction of the liquid crystal molecules in the liquid crystal layer and the transmission axis of one of the first polarizing plate and the second polarizing plate may be parallel to each other with no voltage application between the electrodes. With this configuration, a preferable black display state can be achieved with no voltage application.

Yet another aspect of the present invention may be a liquid crystal display device including the liquid crystal display panel (the first liquid crystal display panel according to the present invention or the second liquid crystal display panel according to the present invention). According to this aspect, a horizontal electric field mode liquid crystal display device having excellent visibility at a bright place and reduced light leakage in the vicinity of a photo spacer can be achieved.

REFERENCE SIGNS LIST 1a, 1b: liquid crystal display device
2a, 2b, 102: liquid crystal display panel
3: backlight
4, 104: first polarizing plate
5, 105: first λ/4 plate
6a, 6b, 106: first substrate
7, 107: second λ/4 plate
8, 108: first alignment film
9, 109: liquid crystal layer
10, 110: second alignment film
11, 111: second substrate
12, 112: second polarizing plate
13, 113: first support substrate
14, 114: black matrix
15R, 15G, 15B, 115R, 115G, 115B: color filter layer
16, 116: overcoat layer
17a, 17b, 117: photo spacer
18, 118: pixel electrode (signal electrode)
19, 119: insulating film
20, 120: common electrode
21, 121: second support substrate
PR, pr: pixel region
L, l: width of pixel electrode
S, s: width of slit (interval of pixel electrode)
A, a: tilt angle of pixel electrode
B, b: diameter of photo spacer
W, w: width of black matrix
Px, Py, px, py: pitch of photo spacer
Q, q: shortest distance between photo spacer and pixel region

The invention claimed is:

1. A liquid crystal display panel comprising, sequentially from an observation surface side toward a back surface side:
    a first polarizing plate;
    a first λ/4 plate;
    a first substrate;
    a second λ/4 plate;
    a first alignment film made of a first alignment material;
    a liquid crystal layer;
    a second substrate; and
    a second polarizing plate,
    wherein one of the first substrate and the second substrate includes a pair of electrodes configured to generate a horizontal electric field at the liquid crystal layer upon voltage application,
    the first substrate includes a black matrix but no photo spacer,
    the second substrate includes a photo spacer overlapping with the black matrix,
    liquid crystal molecules in the liquid crystal layer homogeneously align with no voltage application between the electrodes,
    the second λ/4 plate covers no side surface of the photo spacer, and is a multilayer film including a first layer made of the first alignment material and a second layer made of a liquid crystalline photopolymerizable material, and
    the in-plane slow axis of the first λ/4 plate forms an angle of 45° With the transmission axis of the first polarizing plate and is orthogonal to the in-plane slow axis of the second λ/4 plate.

2. A liquid crystal display panel comprising, sequentially from an observation surface side toward a back surface side:
    a first polarizing plate;
    a first λ/4 plate;
    a first substrate;
    a second λ/4 plate;
    a first alignment film made of a first alignment material;
    a liquid crystal layer;
    a second substrate; and a second polarizing plate, wherein one of the first substrate and the second substrate includes a pair of electrodes configured to generate a horizontal electric field at the liquid crystal layer upon voltage application, the first substrate includes a black matrix, and a first photo spacer disposed on the back surface side of the black matrix and overlapping with the black matrix, the second substrate includes a second photo spacer overlapping with the first photo spacer, liquid crystal molecules in the liquid crystal layer homogeneously align with no voltage application between the electrodes, the second λ/4 plate includes a flat part having a flat surface on the back surface side, covers a side surface of the first photo spacer but not a side surface of the second photo spacer, and is a multilayer film including a first layer made of the first alignment material and a second layer made of a liquid crystalline photopolymerizable material, the height of the first photo spacer is larger than the thickness of the flat part of the second λ/4 plate by 0.2 to 2.0 μm, and the in-plane slow axis of the first λ/4 plate forms an angle of 45° with the transmission axis of the first polarizing plate and is orthogonal to the in-plane slow axis of the second λ/4 plate.

3. The liquid crystal display panel according to claim 1, wherein the transmission axis of the first polarizing plate and the transmission axis of the second polarizing plate are orthogonal to each other.

4. The liquid crystal display panel according to claim 1, wherein the alignment direction of the liquid crystal molecules in the liquid crystal layer and the transmission axis of one of the first polarizing plate and the second polarizing plate are parallel to each other with no voltage application between the electrodes.

5. A liquid crystal display device comprising the liquid crystal display panel according to claim 1.

6. A liquid crystal display panel comprising, sequentially from an observation surface side toward a back surface side:
a first polarizing plate;
a first λ/4 plate;
a first substrate;
a second λ/4 plate;
a liquid crystal layer;
a second substrate; and
a second polarizing plate, wherein one of the first substrate and the second substrate includes a pair of electrodes configured to generate a horizontal electric field at the liquid crystal layer upon voltage application, the first substrate includes a black matrix, and a first photo spacer disposed on the back surface side of the black matrix and overlapping with the black matrix, the second substrate includes a second photo spacer overlapping with the first photo spacer, liquid crystal molecules in the liquid crystal layer homogeneously align with no voltage application between the electrodes, the second λ/4 plate includes a flat part having a flat surface on the back surface side, and covers a side surface of the first photo spacer but not a side surface of the second photo spacer, the height of the first photo spacer is larger than the thickness of the flat part of the second λ/4 plate by 0.2 to 2.0 μm, the in-plane slow axis of the first λ/4 plate forms an angle of 45° with the transmission axis of the first polarizing plate and is orthogonal to the in-plane slow axis of the second λ/4 plate, the second λ/4 plate is made of a self-assembling photo alignment material containing a photo functional group capable of causing at least one chemical reaction selected from the group consisting of photodimerization, photoisomerization, and photo-Fries rearrangement, and the second λ/4 plate has an in-plane retardation of 1.8 nm or larger per a thickness of 100 nm.

7. The liquid crystal display panel according to claim 2, wherein the transmission axis of the first polarizing plate and the transmission axis of the second polarizing plate are orthogonal to each other.

8. The liquid crystal display panel according to claim 2, wherein the alignment direction of the liquid crystal molecules in the liquid crystal layer and the transmission axis of one of the first polarizing plate and the second polarizing plate are parallel to each other with no voltage application between the electrodes.

9. A liquid crystal display device comprising the liquid crystal display panel according to claim 2.

10. The liquid crystal display panel according to claim 2, wherein the first photo spacer penetrates the second λ/4 plate and the first alignment film and reaches into the liquid crystal layer.

11. The liquid crystal display panel according to claim 6, wherein the first photo spacer penetrates the second λ/4 plate and a first alignment film and reaches into the liquid crystal layer.

12. The liquid crystal display panel according to claim 6, wherein the transmission axis of the first polarizing plate and the transmission axis of the second polarizing plate are orthogonal to each other.

13. The liquid crystal display panel according to claim 6, wherein the alignment direction of the liquid crystal molecules in the liquid crystal layer and the transmission axis of one of the first polarizing plate and the second polarizing plate are parallel to each other with no voltage application between the electrodes.

14. A liquid crystal display device comprising the liquid crystal display panel according to claim 6.

* * * * *